US012811840B2

(12) United States Patent
Smith et al.

(10) Patent No.: US 12,811,840 B2
(45) Date of Patent: Nov. 24, 2026

(54) METHOD FOR LAYERED PHASE-SHIFTING SIGNAL MODULATION

(71) Applicant: TeraWave, Inc., Naples, FL (US)

(72) Inventors: Alvie Mckinley Smith, Hillsboro, MO (US); Tristan Kyler Jones, Hillsboro, MO (US)

(73) Assignee: TeraWave, Inc., Saint Louis, MO (US)

( * ) Notice: Subject to any disclaimer, the term of this patent is extended or adjusted under 35 U.S.C. 154(b) by 3 days.

(21) Appl. No.: 19/098,353

(22) Filed: Apr. 2, 2025

(65) Prior Publication Data

US 2025/0317337 A1 Oct. 9, 2025

Related U.S. Application Data

(60) Provisional application No. 63/633,183, filed on Apr. 12, 2024, provisional application No. 63/575,516, filed on Apr. 5, 2024.

(51) Int. Cl.
*H04L 27/12* (2006.01)
*H04L 27/00* (2006.01)
(Continued)

(52) U.S. Cl.
CPC .......... *H04L 27/34* (2013.01); *H04L 27/0008* (2013.01); *H04L 27/04* (2013.01);
(Continued)

(58) Field of Classification Search
CPC .. H01Q 3/00; H01Q 3/26; H01Q 3/38; H01Q 21/22; H04B 1/04; H04B 1/16;
(Continued)

(56) References Cited

U.S. PATENT DOCUMENTS 11,677,145 B1 6/2023 Sharma
2008/0112507 A1* 5/2008 Smith ................ H04L 27/2035 375/308
(Continued)

FOREIGN PATENT DOCUMENTS

CN 102667742 B 8/2015
WO WO-2002031962 A2 4/2002

OTHER PUBLICATIONS

Co-pending U.S. Appl. No. 19/098,305, inventors Smith; Alvie Mckinley et al., filed Apr. 2, 2025.
(Continued)

*Primary Examiner* — Shawkat M Ali
(74) *Attorney, Agent, or Firm* — Cooley LLP

(57) ABSTRACT

A method for layered phase-shifting signal modulation includes receiving input digital data and generating a modulated waveform by combining a plurality of phase-shifting signals with a carrier signal. The generating includes applying, to a carrier signal, a first phase-shifting signal so as to establish a first apparent phase difference between the modulated waveform and the phase of the carrier signal, applying a second phase-shifting signal to the carrier signal so as to substantially eliminate the first apparent phase difference, applying a third phase-shifting signal to the carrier signal to establish a second apparent phase difference between the modulated waveform and the phase of the carrier signal and applying a fourth phase-shifting signal to the carrier signal so as to substantially eliminate the second apparent phase difference wherein the first and second apparent phase differences represent bits of the input digital data.

23 Claims, 12 Drawing Sheets

(51) Int. Cl.

| | |
|---|---|
| ***H04L 27/04*** | (2006.01) |
| ***H04L 27/06*** | (2006.01) |
| ***H04L 27/14*** | (2006.01) |
| ***H04L 27/20*** | (2006.01) |
| ***H04L 27/34*** | (2006.01) |

(52) U.S. Cl.
CPC .............. *H04L 27/06* (2013.01); *H04L 27/12* (2013.01); *H04L 27/14* (2013.01); *H04L 27/2035* (2013.01); *H04L 27/2092* (2013.01)

(58) Field of Classification Search
CPC .......... H04B 1/48; H04B 1/7176; H04B 7/06; H04L 1/00; H04L 5/00; H04L 25/06; H04L 27/00; H04L 27/04; H04L 27/06; H04L 27/12; H04L 27/14; H04L 27/34; H04L 27/365; H04L 27/0008; H04L 27/2035; H04L 27/2092; H04L 27/2627
USPC ....... 327/257, 259–262, 300, 308, 371, 373; 342/368, 372; 375/257, 259–262, 300, 375/308, 371, 373
See application file for complete search history.

(56) References Cited

U.S. PATENT DOCUMENTS

2010/0323640 A1 12/2010 Lozhkin
2012/0033761 A1* 2/2012 Guo .......................... H01Q 3/36 375/316
2012/0076239 A1 3/2012 Charlet et al.
2013/0027128 A1 1/2013 Sorrells et al.
2013/0121342 A1* 5/2013 Kim ...................... H04W 72/56 375/329
2016/0065195 A1 3/2016 Farazian et al.
2019/0140882 A1 5/2019 Schultze
2024/0088538 A1 3/2024 Pfannenmüller et al.

OTHER PUBLICATIONS

Co-pending U.S. Appl. No. 19/098,326, inventors Smith; Alvie Mckinley et al., filed Apr. 2, 2025.
Co-pending U.S. Appl. No. 19/098,339, inventors Smith; Alvie Mckinley et al., filed Apr. 2, 2025.
Co-pending U.S. Appl. No. 19/098,371, inventors Smith; Alvie Mckinley et al., filed Apr. 2, 2025.
International Search Report and Written Opinion for Application No. PCT/US2025/023043, dated Jul. 30, 2025, 12 pages.
International Search Report and Written Opinion for Application No. PCT/US2025/023161, dated Aug. 21, 2025, 17 pages.
Invitation to Pay Additional Fees for Application No. PCT/US2025/023043, dated May 22, 2025, 3 pages.
Invitation to Pay Additional Fees for Application No. PCT/US2025/023161, dated Jun. 25, 2025, 3 pages.
Shannon, C.E. (Jul. 1948). "A mathematical theory of communication," The Bell System Technical Journal 27(3):379-423.

* cited by examiner

METHOD FOR LAYERED PHASE-SHIFTING SIGNAL MODULATION

CROSS-REFERENCE TO RELATED APPLICATIONS

This application claims the benefit of priority under 35 U.S.C. § 119(e) of U.S. Provisional Patent Application No. 63/575,516, entitled SYSTEM AND METHOD FOR COMMUNICATION OVER TIME-BASED CHANNELS, filed on Apr. 5, 2024, and of U.S. Provisional Patent Application No. 63/633,183, entitled INTRA-PERIOD SIGNAL MODULATION OVER TIME-BASED CHANNELS, filed on Apr. 12, 2024, the content of each of which is incorporated herein by reference in its entirety for all purposes. This application is related to U.S. patent application Ser. No. 19/098,305, entitled COMMUNICATION OVER TIME-BASED CHANNELS USING LAYERING SIGNALS, filed on Apr. 2, 2025, to U.S. patent application Ser. No. 19/098,326, entitled SYSTEM FOR COMMUNICATION OVER TIME-BASED CHANNELS, filed on Apr. 2, 2025, to U.S. patent application Ser. No. 19/098,339, entitled METHOD FOR COMMUNICATION OVER TIME-BASED CHANNELS, filed on Apr. 2, 2025, and to U.S. patent application Ser. No. 19/098,371, entitled SYSTEM FOR LAYERED PHASE-SHIFTING SIGNAL MODULATION, filed on Apr. 2, 2025, the content of each of which is incorporated herein by reference in its entirety for all purposes.

FIELD

The present disclosure pertains generally to data communication systems and, in particular, to methods and systems for signal modulation.

BACKGROUND

There are various transmission channels used for transmitting data or information. Telephone lines consisting of copper wires were used for well over a hundred years for transmitting both voice and data. Radio transmission of radio signals have been around for almost a hundred years. A radio station sends a radio signal out over the airwaves to be received by a radio set. As is known, a radio station has programming which may include music, news, or programs. Satellites are an example of another transmission channel in which a satellite dish positioned a first location is used to transmit a signal to a satellite to be beamed or sent from the satellite to a second satellite dish positioned at a location remote from the first location. More recently cellular communication systems have been used to communicate between cell phones. An enormous amount of data is being sent using cellular communication systems. At this point in time, it is essential to be able to increase the data throughput over any transmission channel that is used. It is also important to address the problem of signal degradation during transmission of the signal. Some problems encountered when transmitting a signal over a transmission channel include transmission path delay, interference, and non-linearity.

Some transmission techniques or schemes that have been developed and used in an effort to increase data throughput over a transmission channel are Amplitude Modulation (AM), Frequency Modulation (FM), Phase Modulation, QAM (Quadrature Amplitude Modulation), QPSK (Quadrature Phase Shift Keying), PSK (Phase Shift Keying), and APSK (Amplitude and Phase Shift Keying).

Amplitude Modulation is a modulation technique used for transmitting information by use of a radio carrier wave. A sinusoidal carrier wave has its amplitude modulated (multiplied) by an audio waveform before transmission. The audio waveform modifies the amplitude of the sinusoidal carrier wave. Some disadvantages associated with the use of an amplitude modulation signal are that an amplitude modulation signal is not efficient in terms of its power usage, it is not efficient in terms of its use of bandwidth, it requires a bandwidth equal to twice that of the highest audio frequency, and it is prone to high levels of noise.

Frequency Modulation is a modulation technique that encodes information in a carrier wave by varying the frequency of the wave. Although Frequency Modulation has some advantages over Amplitude Modulation some disadvantages include that it requires a more complicated demodulator and that is has a poorer spectral efficiency than some other modulation techniques.

QAM is a form of multilevel amplitude and phase modulation that modulates a source signal into an output waveform with varying amplitude and phase. A system that employs QAM modulates a source signal into an output waveform with varying amplitude and phase. A message to be transmitted is mapped to a two-dimensional four quadrant signal space or constellation having signal points or phasors each representing a possible transmission level. Each signal point in the constellation is referred to as a symbol. The QAM constellation has a coordinate system defined by an I or in-phase axis and a Q or quadrature axis or an IQ plane. A symbol may be represented by both I and Q components. One of the disadvantages of the use of QAM is that for the higher data rates the peak to average power ratio is high. For example, in a typical constellation diagram for 16QAM, it can be seen that there are four possible power levels. As the order of the modulation increases, so the number of power levels needed increases. All of this results in ever higher peak to average power ratios being experienced.

QPSK has a synchronous data stream modulated onto a carrier frequency before being over a channel. The carrier can have four states such as 45°, 135°, 225°, or 315°. QPSK also employs a quadrature modulation where the signal points can be described using two orthogonal coordinate axes, such as the IQ plane. With conventional QPSK, there is the problem that the transition between two diagonal transmission symbol points in the complex plane passes through the zero point. In the transition between these diagonal transmission symbols, a lowering of the amplitude may occur, the so-called envelope, to practically zero. On the receiver side, it complicates the necessary synchronization and favors nonlinearities in the transmission path, signal distortion, and unwanted intermodulation.

PSK is another digital modulation process which transmits a message by modulating the phase of a carrier wave. One disadvantage of using PSK is that when a high order PSK constellation is used the error-rate becomes too high.

As the name APSK indicates, this form of modulation uses amplitude and phase shift keying. In this modulation scheme a signal is conveyed by modulating both the amplitude and the phase of a carrier wave. Amplitude and frequency shift keying is able to reduce the number of power levels required to transmit information for any given modulation order.

SUMMARY

The present disclosure relates to a system and method for communication over time-based communication channels, which may hereinafter be referred to as "time channels" or, equivalently, "time-based channels". The disclosed method may include summing or otherwise adding various constituent signals at different points in time within a time channel in order to yield a modulated signal having shape or phase characteristics representative of input data to be communicated. Although modulated waveforms may be created within a time channel by combining multiple different types of signals, in some embodiments an approach termed layering signal modulation may be utilized to develop modulated waveforms for communication via a time channel. Consistent with this approach, different layering signals of a single frequency, or in some cases different layering signals of a small number of frequencies, are summed or otherwise added to a carrier signal at different times in order to convey information. The layering signals will typically be of amplitudes relatively smaller than an amplitude of the carrier signal. The layering signals and the carrier signal may be of identical frequency. Alternatively, the layering signals may be of a frequency different than the carrier frequency. In some embodiments the frequency of the layering signals is a multiple of the carrier frequency.

In one embodiment a method for layering frequency modulation in accordance with the disclosure includes generating a modulated waveform using a carrier signal and a plurality of layering signals. The plurality of layering signals may be of the same frequency as the carrier signal or may be of a frequency different from the carrier frequency, such as a multiple of the carrier frequency. The method includes generating the modulated waveform by modifying an instantaneous amplitude of the modulated waveform relative to an instantaneous amplitude of a carrier signal during selected periods of the modulated waveform in accordance with the input digital data. The instantaneous amplitude of the modulated waveform during each of the selected periods may be defined by a summation of one or more of the layering signals and the carrier signal.

In some embodiments, the modulated waveform and the carrier signal may be of a first frequency. In some embodiments, the carrier signal may be of a first phase. In some embodiments, a first layering signal of the plurality of layering signals may be of the first frequency and a second phase different from the first phase.

The plurality of layering signals may include a first layering signal of a second frequency, the second frequency being an integral multiple of the first frequency. At least a subset of the periods of the modulated waveform may each represent one bit of the input digital data. In other embodiments at least a subset of the periods of the modulated waveform each represent two or more bits of the input digital data.

In some embodiments, a phase of the modulated waveform may lag a phase of the carrier signal and thereby represent a first binary value within the input digital data. A phase of the modulated waveform may lead a phase of the carrier signal and thereby represents a second binary value within the input digital data.

At least some of the layering signals may be designed such that their power is substantially zero upon initiation of summing with the carrier signal. In certain embodiments the amplitudes of the layering signals may be less than an amplitude of the carrier signal.

Embodiments of the present disclosure may also include a method of recovering input digital data from a received analog signal formed from a modulated waveform where an instantaneous amplitude of the modulated waveform may be defined by a summing of a carrier signal and one of more layering signals. The method includes generating first digital samples of the received analog signal, the first digital samples representing a first portion of a period the modulated waveform. The method may also include generating second digital samples of the encoded analog waveform, the second digital samples representing a second portion of the period of the modulated waveform. A bit of the input digital data encoded by the period of the modulated waveform may then be estimated based upon the first digital samples and the second digital samples.

In some embodiments, the modulated waveform and the carrier signal wave may be of a first frequency. In some embodiments, phase differences between the modulated waveform and the carrier signal occurring during periods of the modulated waveform represent bits of the input digital data. In some embodiments, the estimating the bit of the input digital data includes computing a first sum of squares of the first digital samples over a first integration interval encompassed by the first portion of the modulated waveform. Embodiments may also include computing a second sum of squares of the second digital samples over a second integration interval encompassed by the second portion of the modulated waveform. Embodiments may also include comparing the first sum of squares and the second sum of squares.

The present disclosure is also directed to an apparatus including one or more processors and a memory storing instructions which, when executed by the one or more processors, cause the one or more processor to perform various functions. These functions may include receiving input digital data and storing first digital data corresponding to at least one period of a first modulated waveform. A phase of the first modulated waveform may be shifted in a positive direction during the at least one period relative to a phase of a carrier signal, wherein an instantaneous amplitude of the first modulated waveform over the at least one period is based upon a summing of the carrier signal and at least a first layering signal. The functions performed by the one or more processors may further include storing second digital data representing at least one period of a second modulated waveform. A phase of the second modulated waveform may be shifted in a negative direction relative to the phase of the carrier signal, wherein an instantaneous amplitude of the second modulated waveform over the at least one period of the second modulated waveform is based upon a summing of the carrier signal and at least a second layering signal. In some embodiments the functions performed by the processor further include generating, in response to the input digital data, a modulated waveform using the first digital data and the second digital data wherein the first digital data represents occurrences of a first binary value within the input digital data and the second digital data represents occurrences of a second binary value within the input digital data.

In some embodiments, the phase of the first modulated waveform period may be also shifted in the negative direction during the at least one period of the first modulated waveform relative to the phase of the carrier signal. In some embodiments, the instantaneous amplitude of the first modulated waveform may be based upon a summing of the carrier signal and at least the first layering signal and a third layering signal.

In some embodiments, the shifting of the phase of the first modulated waveform in the positive direction represents a first binary value within the input digital data. In some embodiments, the shifting of the phase of the second modulated waveform in the negative direction represents a second binary value within the input digital data where the second binary value is different from the first binary value.

In some embodiments, the first layering signal may be of a first phase such that a power of the first layering signal may be substantially zero upon initiation of the summing of the carrier signal and the first layering signal. In some embodiments, the second layering signal may be of a second phase such that a power of the second layering signal may be substantially zero upon initiation of the summing of the carrier signal and the second layering signal.

In some embodiments, the carrier signal, the first layering signal and the second layering signal may be sinusoidal. In some embodiments, the first layering signal and the modulated signal may be of a first frequency. In some embodiments, the second layering signal may be of a second frequency, the second frequency being an integral multiple of the first frequency.

In some embodiments, the first layering signal may be of a first phase such that a power of the first layering signal may be substantially zero upon initiation of the summing of the carrier signal and the first layering signal. In some embodiments, the second layering signal may be of a second phase such that a power of the second layering signal may be substantially zero upon initiation of the summing of the carrier signal and the second layering sine signal.

Embodiments of the present disclosure may also include a system, including an input buffer configured to store input digital data. The system may include a time domain modulator for generating a modulated waveform based upon the input digital data. In some embodiments, phase shifts in the modulated waveform relative to a carrier signal encode the input digital data within the modulated waveform. The phase shifts may correspond to summations of one or more layering signals with the carrier signal. The system may also include one or more digital-to-analog converters for generating an encoded analog waveform from a representation of the encoded waveform.

In some embodiments, the modulated waveform and the carrier signal may be of a first frequency. Each of the phase shifts may represent at least one bit of the input digital data and occur within different periods of the modulated waveform. In other embodiments two or more of the phase shifts may represent two or more bits of the input digital data and may occur within a single period of the modulated waveform. In some embodiments, the carrier signal and the one or more layering signals may be sinusoidal.

Embodiments of the present disclosure may also include a communication device, including a radio frequency (RF) module and a computing component communicatively coupled to the RF module, the computing component defining a software defined radio. In some embodiments, the computing component may include at least one processor. The communication device may also include an input buffer configured to store digital input data. Embodiments may also include memory storing instructions which, when executed by the at least one processor, implement a time domain modulator configured to generate a modulated waveform based upon the input digital data. In some embodiments, phase shifts in the modulated waveform relative to a carrier signal encode the input digital data within the modulated waveform.

In some embodiments, the phase shifts correspond to summations of one or more layering signals and the carrier signal at defined points in time. The communication device may also include one or more digital-to-analog converters for generating an encoded analog waveform from a representation of the encoded waveform, the encoded analog waveform being provided to the RF module. In some embodiments, the carrier signal and the one or more layering signals may be sinusoidal.

In one particular aspect the disclosure relates to a method which includes receiving input digital data and generating a modulated waveform by combining a plurality of phase-shifting signals with a carrier signal. The process of generating the modulated waveform includes applying a first phase-shifting signal to the carrier signal so as to establish a first apparent phase difference between the modulated waveform and a phase of the carrier signal during a first period of the modulated waveform. A second phase-shifting signal is applied to the carrier signal so as to substantially eliminate the first apparent phase difference between the modulated waveform and the phase of the carrier signal during the first period of the carrier signal. The process of generating the modulated waveform may further include applying a third phase-shifting signal to the carrier signal to establish a second apparent phase difference between the modulated waveform and the phase of the carrier signal during a second period of the modulated waveform. A fourth phase-shifting signal is applied to the carrier signal so as to substantially eliminate the second apparent phase difference between the modulated waveform and the phase of the carrier signal during the second period of the carrier modulated waveform. The first apparent phase difference represents a first bit of the input digital data and the second apparent phase difference represents a second bit of the input digital data.

The application of the first phase-shifting signal to the carrier signal may include adding the first phase-shifting signal to the carrier signal beginning at a phase angle of approximately 90 degrees in the first period of the carrier signal. The application of the second phase-shifting signal to the carrier signal may include adding the second phase-shifting signal to the carrier signal beginning at a phase angle of approximately 270 degrees in the first period of the carrier signal. The application of the third phase-shifting signal to the carrier signal may include adding the third phase-shifting signal to the carrier signal beginning at a phase angle of approximately 90 degrees in the second period of the carrier signal. The application of the fourth phase-shifting signal to the carrier signal may include adding the fourth phase-shifting signal to the carrier signal beginning at a phase angle of approximately 270 degrees in the second period of the carrier signal.

The disclosure also pertains to a method which includes receiving input digital data and generating a modulated waveform having a shape corresponding to a summation of a plurality of phase-shifting signals with a carrier signal. The summation includes a first summation of the carrier signal and a first phase-shifting signal and a second phase-shifting signal of the phase shifting signals. The first summation establishes a first apparent phase difference between the modulated waveform and a phase of the carrier signal during a first period of the modulated signal. The summation also includes a second summation of the carrier signal and a third phase-shifting signal and a fourth phase-shifting signal of the phase shifting signals. The second summation establishes a second apparent phase difference between the modulated waveform and the phase of the carrier signal during a second period of the modulated signal. The first apparent phase difference represents a first bit of the input digital data and the second apparent phase difference represents a second bit of the input digital data.

The disclosure further relates to an apparatus including one or more processors and a memory storing instructions which, when executed by the one or more processors, cause the one or more processors to perform various operation by executing the instructions. These operations include receiving input digital data and generating a modulated waveform by combining a plurality of phase-shifting signals with a carrier signal. The combining operation may include applying a first phase-shifting signal to the carrier signal so as to establish a first apparent phase difference between the modulated waveform and a phase of the carrier signal during a first period of the modulated waveform. The combining operation may further include applying a second phase-shifting signal to the carrier signal so as to substantially eliminate the first apparent phase difference between the modulated waveform and the phase of the carrier signal during the first period of the carrier signal. The combining operation may also involve applying a third phase-shifting signal to the carrier signal to establish a second apparent phase difference between the modulated waveform and the phase of the carrier signal during a second period of the modulated waveform. The combining operation may further include applying a fourth phase-shifting signal to the carrier signal so as to substantially eliminate the second apparent phase difference between the modulated waveform and the phase of the carrier signal during the second period of the carrier modulated waveform. The first apparent phase difference represents a first bit of the input digital data and the second apparent phase difference represents a second bit of the input digital data.

The disclosure is further directed to an apparatus including one or more processors and a memory storing instructions which, when executed by the one or more processors, cause the one or more processors to perform operations. These operations include receiving input digital data and generating a modulated waveform having a shape corresponding to a summation of a plurality of phase-shifting signals with a carrier signal. The summation includes a first summation of the carrier signal and a first phase-shifting signal and a second phase-shifting signal of the phase shifting signals. The first summation establishes a first apparent phase difference between the modulated waveform and a phase of the carrier signal during a first period of the modulated signal. The summation also includes a second summation of the carrier signal and a third phase-shifting signal and a fourth phase-shifting signal of the phase shifting signals. The second summation establishes a second apparent phase difference between the modulated waveform and the phase of the carrier signal during a second period of the modulated signal. The first apparent phase difference represents a first bit of the input digital data and the second apparent phase difference represents a second bit of the input digital data.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. Also, common but well-understood elements that are useful or necessary in a commercially feasible embodiment are often not depicted in order to facilitate a less obstructed view of these various embodiments of the present invention. In the drawings, like reference characters generally refer to like features (e.g., functionally similar and/or structurally similar elements).

DETAILED DESCRIPTION

Figure 1:
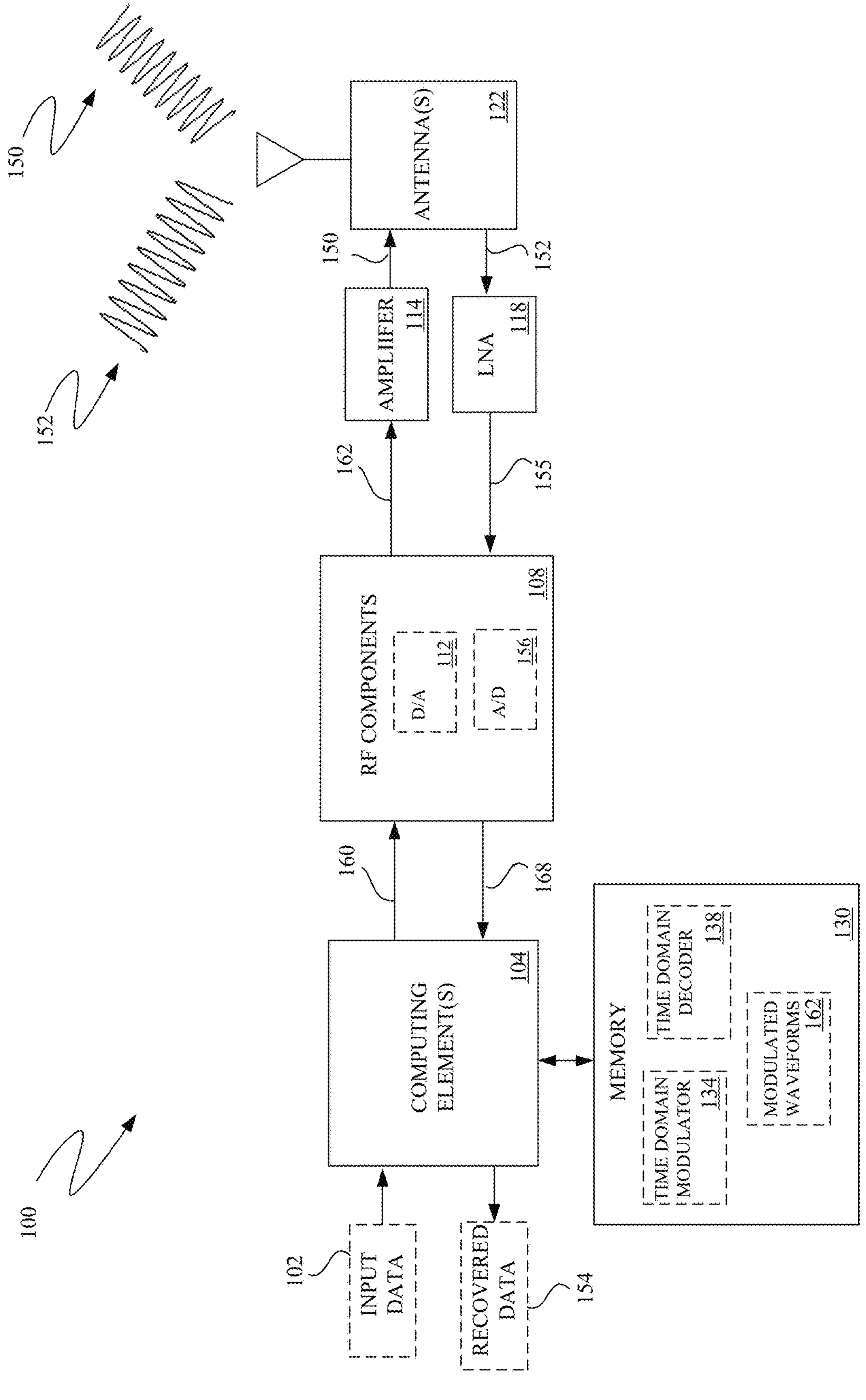
FIG. 1 illustrates a time domain communication device configured to transmit and receive modulated waveforms in accordance with an embodiment.

Disclosed herein is a system and method for communication of modulated waveforms over time channels. As is discussed in detail below, the method may include adding or otherwise summing various constituent signals at different points in time within a time channel in order to yield a modulated signal having shape or phase characteristics representative of input data to be communicated. Alternatively, modulated waveforms having shape or phase characteristics corresponding to the summation of such constituent signals may be generated, stored, and then recalled and transmitted based upon the input data to be conveyed.

Although modulated waveforms may be created for propagation through a time channel using a variety of different types of signals, in some embodiments an approach termed layering signal modulation has been found to yield modulated waveforms with particularly favorable spectral characteristics. Consistent with this approach, a modulated waveform is produced which exhibits phase shifts relative to a carrier signal that are representative of input digital data. These phase shifts are reflective of the sequential summing over time of the carrier signal with layering signals of relatively small amplitude relative to the amplitude of the carrier signal. In some embodiments each of the phase shifts results from the summing of a layering signal and a carrier signal (e.g., a sinusoid) beginning at a chosen time within a selected period of the carrier signal. As a result, the modulated waveform resulting from each such summing undergoes a subtle change in instantaneous amplitude or shape relative to the shape of the carrier signal, which may hereinafter also be referred to as a "phase shift".

The introduction of a phase shift in the modulated waveform resulting from the summing of a carrier signal and a layering signal may, depending upon the phase of the layering signal, occur within the same period of the carrier signal or at a later time. For example, in one embodiment the phase and timing of application of each layering signal is selected such that the phase shift in the modulated waveform resulting from the summing is not materially manifested until some desired time following initiation of the summing (e.g., after a time corresponding to a quarter period of the carrier signal). The phase shift introduced into the modulated sinusoid by each layering signal may represent one or more bits of the input digital data.

The amplitude or power of each layering signal will typically be selected to be substantially less than the amplitude or power of the carrier signal. For example, in some embodiments the amplitude or power of the layering signal will be set at less than 10% of the amplitude or power of the carrier signal. In other embodiments the amplitude or power of the layering signal will be chosen to be less than 5% of the amplitude or power of the carrier signal.

In some embodiments the carrier signal, each layering signal and the modulated sinusoid are all of substantially identical frequency. In other embodiments one or more of the layering signals may be of a frequency different than the carrier frequency. For example, in some embodiments one or more of the layering signals may be of frequencies that are integral multiples of the frequency of the carrier signal.

In one embodiment layering signals are summed with the carrier signal such that a phase difference between the modulated sinusoid and the carrier signal occurring during each period of the modulated sinusoid represents at least one bit of the input digital data. In other embodiment the layering signal are summed with the carrier signal such that multiple phase shifts may be introduced into the modulated sinusoid during each period of the modulated sinusoid, thereby enabling each period of the modulated sinusoid to represent multiple bits of the input digital data.

Attention is now directed to FIG. 1, which illustrates a time domain communication device 100 configured to transmit and receive modulated waveforms in accordance with the disclosure. In some embodiments the communication device may be implemented as a software defined radio as described hereinafter. The communication device 100 may include computing elements 104, RF components 108, a transmit amplifier 114, a low noise amplifier (LNA) 118, and one or more antennas 122. The computing elements 104 are operatively connected to a memory 130 configured to store instructions which, when executed by the computing elements 104, enable the computing elements 104 to implement a time domain modulator 134 and a time domain decoder 138.

In one embodiment the computing element(s) 104 execute code for a software-defined radio (SDR) that may work with the RF components 108, amplifier 114, LNA 118 and antenna(s) 122 to transmit and receive modulated sinusoids having the characteristics described herein. The computing element(s) 104 may include one or more processing elements such as microprocessors, field-programmable gate arrays (FPGAs), or digital signal processors (DSPs). In some embodiments software code executed by the computing element(s) 104 controls the SDR's functions. These functions may include implementing the time domain modulator 134 and the time domain decoder 138 as well as various signal "overhead" functions such as, for example, timing synchronization.

The communication device 100 may be configured for fully duplexed operation as a communication signal transmitter and a receiver. When functioning as a communication signal transmitter, the communication device 100 operates to generate and transmit a modulated RF waveform 150 characterized by apparent shifts in phase relative to a carrier phase, such shifts being representative of input digital data 102. The computing elements 104 may receive input digital data 102 over an interface such as via a USB, serial, Ethernet, HDMI or via another standard or proprietary data interface. The input digital data 102 may represent video, audio, textual or other information or combinations thereof.

In one embodiment the time domain modulator 134 may cause the computing elements 104 to generate digital representations of modulated waveforms 160 based upon the input data by calculating appropriate phase shifts to be incorporated within the modulated waveforms 160 as described hereinafter. Alternatively, the phase shifts appropriate for representation of various bits or bit patterns within the input digital data may be pre-computed in advance. In such embodiments the time domain modulator 134 would simply generate layering sinusoids of appropriate phases and sum them with a carrier signal at predetermined times within the periods of the carrier signal. In still other embodiments the time domain modulator 134 may cause the computing elements 104 to essentially concatenate periods or segments of modulated waveforms 162 stored within the memory 130. The sequence of modulated waveform segments 162 resulting from this concatenation forms the modulated waveform 160 is representative of the input data 102. One advantage of this embodiment is that the time domain modulator 134 would not be required to generate layering sinusoids in substantially real time for summation with a carrier signal. Rather, the time domain modulator 134 could instead simply recall the required waveform segments from memory 130 as needed to generate the modulated waveform 160.

The RF components 108 receive the digital information representing the modulated waveform 160 and convert it to an analog representation using a digital to analog converter (D/A) 112. The RF components 108 may also further process the analog waveform produced by the D/A converter 112 in order generate a modulated radio frequency (RF) waveform 162. The RF components 108 send the modulated RF waveform 162 to the amplifier 114 for amplification. The antenna(s) 122 may transmit the modulated RF waveform 150 output by the amplifier 114.

During operation of the communication device 100 as a receiver, which may be contemporaneous with operation of the communication device 100 as a transmitter, the communication device 100 operates to receive and decode a received modulated RF waveform 152 representative of recovered data 154. Upon being received by the antenna(s), the modulated RF waveform 152 is provided to the LNA 118 for amplification. The resulting amplified received signal 155 is provided to the RF components 108, which may perform duplexing operations, analog to digital conversions 156, and potentially other conventional RF signal processing operations. A received modulated signal 168 corresponding to a digital representation of the received modulated RF waveform 152 is then provided by the RF components 108 to the computing elements 104. During receive mode operation the computing elements 104 are configured to implement the time domain decoder 138. In a fully duplexed mode of operation the computing elements 104 will be configured to simultaneously implement the time domain modulator 134 and the time domain decoder 138.

In one embodiment the time domain decoder 138 is configured to detect differences between a phase of the digital representation of the received modulated RF waveform 152 (as represented by the received modulated signal 168) and a reference carrier phase. The reference carrier phase utilized by the time domain decoder 138 during the decoding process may be established in a variety of ways. For example, in one implementation the received modulated RF waveform 152 is initially transmitted for a brief period as a pure, i.e., unmodulated, sinusoid in order to enable the time domain decoder 138 to establish the reference carrier phase. This process may be periodically repeated to ensure that the time domain decoder 138 remains locked to the reference carrier phase. Alternatively, the transmitter which transmits the modulated RF waveform 152 may simultaneously transmit an unmodulated sine wave, or "pilot" signal, of a known frequency different from the frequency of the carrier associated with the modulated RF waveform 152. Once the time domain decoder 138 or other receiver element acquires the phase of the pilot signal it may be used to determine an appropriate carrier phase for use in decoding the received modulated RF waveform 152. The approaches to obtaining timing information from the received modulated RF waveform 152 described above are merely exemplary. For example, in other embodiments the modulated RF waveform 152 may be generated so as to include artifacts or characteristics facilitating such timing acquisition.

In other embodiments a third-party reference signal may be utilized to establish the reference carrier phase. For example, consider the case in which the transmitter from which the modulated RF waveform 152 is transmitted and the communication device 100 are both able to receive a signal transmitted by a third party (e.g., an FM signal transmitted by a transmitter for an FM radio station). In this case both the transmitter transmitting the modulated RF waveform 152 and the communication device 100 could lock their timing to the third-party FM signal, thereby enabling the time domain decoder 138 of the communication device 100 to establish the reference carrier phase. In such an embodiment the timing of the time domain modulator 134 within the device 100 and a receiver device disposed to receive the modulated RF waveform 150 could also be established by the third-party FM signal. This would enable such a receiver device to also establish an appropriate reference carrier phase for decoding a digital representation of the modulated RF waveform 150 transmitted by the device 100.

Once the reference carrier phase has been established, the time domain decoder 138 may determine the relative phase shifts of the digital representation of the received modulated RF waveform 152 by comparing it to the reference carrier phase. As an example, this comparison may involve comparing values of the digital representation of the received modulated RF waveform 152 to values of the reference carrier at specific phases. This enables the time domain decoder 138 to detect forward and reverse shifts in the phase of the digital representation of the received modulated RF waveform 152 relative to the reference carrier phase. In one embodiment these forward and reverse phase shifts may be directly mapped to corresponding logical "1" and "0" values encoded by the received modulated RF waveform 152, thereby producing estimates of the recovered data 154.

Alternatively, once the reference carrier phase has been determined the time domain decoder 138 may define integration intervals relative to the reference carrier phase over which values of the digital representation of the received modulated RF waveform 152 are integrated. For example, a first integration interval could be established within a first half of a period of the the digital representation of the received modulated RF waveform 152 and a second integration interval could be established within a second half of a period of the digital representation of the received modulated RF waveform 152. The first and second integration intervals could be defined to have edges at a predefined number of degrees (e.g., ±15 degrees) from the zero crossings of the reference carrier phase and to extend for a predefined number of degrees from such zero crossings. In one embodiment a comparison is made by the time domain decoder 138 of the squares of the amplitude of the digital representation of the received modulated RF waveform 152 across the two integration intervals. This may, for example, involve computing the sum of the squares of the values of the digital representation of the received modulated RF waveform across the integration intervals. By comparing the values of the integrals computed over the different integration intervals the time domain decoder 138 may determine the phase of the received modulated RF waveform 152 relative to the reference carrier phase. Again, these relative phases may be directly mapped to estimates of the recovered data 154.

In one embodiment the communication device 100 may allocate the input digital data among a plurality, and in some cases hundreds, thousands or millions, of time channels conveying modulated waveforms narrowly spaced in frequency. By simultaneously transmitting data over a plurality of time channels configured to use carrier/layering signals of a corresponding plurality of frequencies (which may or may not be contiguous) in the manner described herein, increased overall data rates may be supported.

Figure 2:
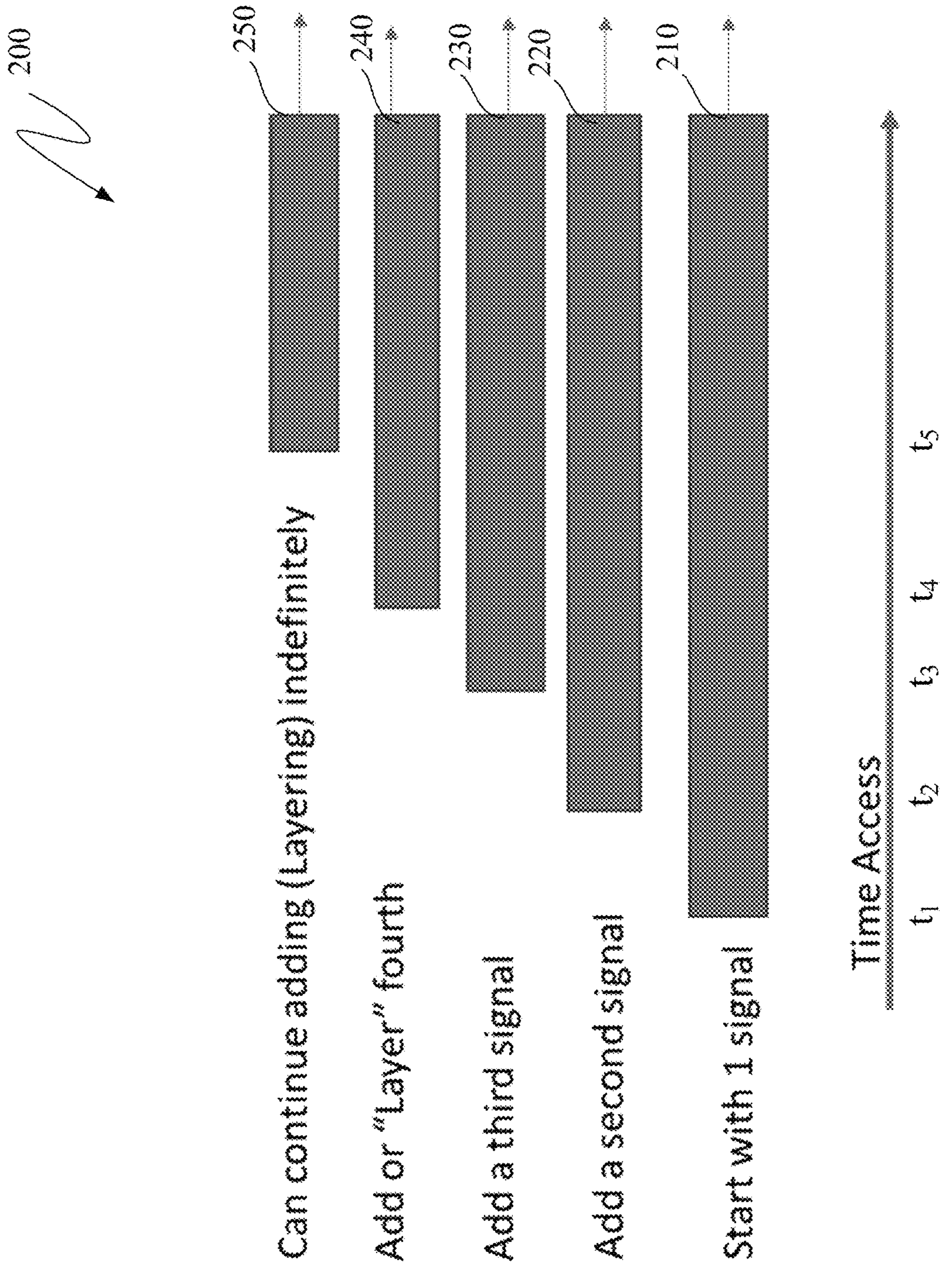
FIG. 2 is a high-level representation of a process for communicating information via a time channel using frequency-layering modulation in accordance with an embodiment.

Turning now FIG. 2, a high-level representation is provided of a process 200 for communicating information via a time channel using frequency-layering modulation in accordance with the disclosure. As may be appreciated from FIG. 2, the disclosed frequency-layering process corresponds to the creation of a modulated waveform through the addition of particular layering signals to a carrier signal at a defined times during periods of the carrier signal. This summing operation may involve summing of, for example, (i) a chosen layering sine signal with the carrier signal during each period of the carrier signal, (ii) two different chosen layering signals with the carrier signal during each period of the carrier signal, or (iii) one chosen layering signal with the carrier signal during only a subset of the periods of the carrier signal. As a result of these summing operations, subtle apparent phase shifts relative to the carrier phase are introduced into the modulated waveform at desired times. Embodiments in which each layering signal, which may be in the form of a single sinusoidal frequency or tone, is of the same frequency as a base or carrier signal may be referred to herein as Single-Layered Frequency (SLF) modulation. Embodiments in which each at least some of the layering signals or frequencies are of a frequency different from the base or carrier signal frequency may be referred to herein as Multi-Layered Frequency (MLF) modulation.

As shown in FIG. 2, in one embodiment a process for frequency layering includes generating a first signal 210, e.g., a carrier signal, at a time $t_1$. A second signal 220 is then summed with the first signal at a time $t_2$. Next a third signal 230 is summed together, at a time $t_3$, with the sum of the first signal 210 and the second signal 220. Similarly, a fourth signal 240 may be summed with the sum of the first signal 210, the second signal 220 and the third signal 230 at a time $t_4$. This process of summing additional signals 250 with the existing sum of signals may continue indefinitely.

In one SLF embodiment the first signal 210 may be a sine wave of a defined frequency and amplitude. In this SLF embodiment each of the remaining signals 220, 230, 240, 250 will be of the defined frequency and typically of lesser amplitude (e.g., 40% or less of the amplitude of the first signal 210). In one MLF embodiment at least some of the remaining signals 220, 230, 240, 250 will not be of the defined frequency but all will typically be of lesser amplitude than the first signal 210.

As may be appreciated from the descriptions of the disclosed embodiments provided hereinafter, the inventive signal layering modulation scheme is based upon a communication channel model fundamentally different from the channel models applicable to conventional modulation schemes. Specifically, embodiments of the disclosure contemplate a time-based communication channel (or "time channel") in which various constituent signals are combined at different points in time in order to yield a modulated signal having shape or phase characteristics representative of input data to be communicated. In one disclosed approach the constituent signals include layering signals and a carrier signal of a single frequency or a small number of frequencies (e.g., 2 frequencies) that are summed or otherwise combined at different times in order to encode the input data.

The time channel described herein provides an alternative to the communication channels pertinent to conventional modulation techniques. Recall that classic communication theory provides that the "channel" is merely the medium used to transmit the signal from a transmitter to a receiver. It may be a pair of wires, a coaxial cable, a band of radio frequencies, or a beam of light. See, e.g., C. E. Shannon, "A mathematical theory of communication," in *The Bell System Technical Journal*, vol. 27, no. 3, pp. 379-423, July 1948. Importantly, although a coaxial cable or a band of frequencies are examples of communication channels, they do not comprise an exhaustive list of all such channels. One foundational insight underpinning the disclosed embodiments is that the combination of signals within a time channel provides an alternative modality for conveying information from a transmitter to a receiver. In one embodiment the combination of signals includes a carrier signal and layering signals of the same or a small number of frequencies. While the bandwidth of conventional communication channels in which a band of frequencies is employed to convey modulated signals is limited by the extent of such a frequency band, the rates at which information may be conveyed through the time channel described herein is instead believed to be limited by time-based factors. For example, in some embodiments the rate at which information may be conveyed by the disclosed signal layering techniques may be limited by the number of time slots or intervals in which a given period of a carrier signal or other constituent signal may be subdivided and utilized for combining with other signals. As a consequence, embodiments of the disclosed signal layering modulation system are capable of delivering very high data rates over a single or minimal number of frequencies by adding constituent signals at selected points throughout a time channel as described herein.

In order to illustrate processes for frequency layering within a time-based channel in accordance with the disclosure various examples are presented below. Consider initially the case in which it is desired to communicate the following sequence of data from a transmitter at point or location "A" to a receiver at a point or location "B": 1,0,1,1,0,1,0,0. In order to convey this data a modulated waveform having small shifts relative to a carrier signal phase will be generated. Each of the shifts present in the modulated waveform may represent at least one bit of the data to be conveyed. Upon receiving the transmitted modulated waveform at point B, the receiver will detect the shifts present in the received waveform and recover estimates of the transmitted data.

Set forth below are a set of four examples SLF/MLF frequency layering approaches to generating ultra-narrowband modulated waveforms capable of conveying the data sequence of interest (i.e., 1,0,1,1,0,1,0,0). It may be appreciated that these are merely exemplary SLF/MLF frequency layering approaches and countless others could be developed and utilized consistent with the teachings herein. In a first MLF example, Example 1, multiple layering signals selected from two distinct frequencies will be used to modulate 4-bit positions for each cycle (or "period") of the modulated waveform generated through the MLF process. In Example 2, SLF modulation is employed to layer multiple signals of the same single frequency so as to encode 1 data bit within each period of the modulated waveform generated through the SLF process.

More specifically, In Example 1, layering signals of the two layering frequencies will be layered, i.e., added together at specifically chosen moments in time and at specifically chosen phases. The resulting modulated MLF waveform will encode 4 data bits per period while only utilizing two frequencies. In Example 2, SLF modulation is employed to repetitively sum layering signals of one frequency at selected moments in time and selected phases to encode 1 bit per period of the resulting modulated SLF waveform while using only a single frequency.

Figure 3:
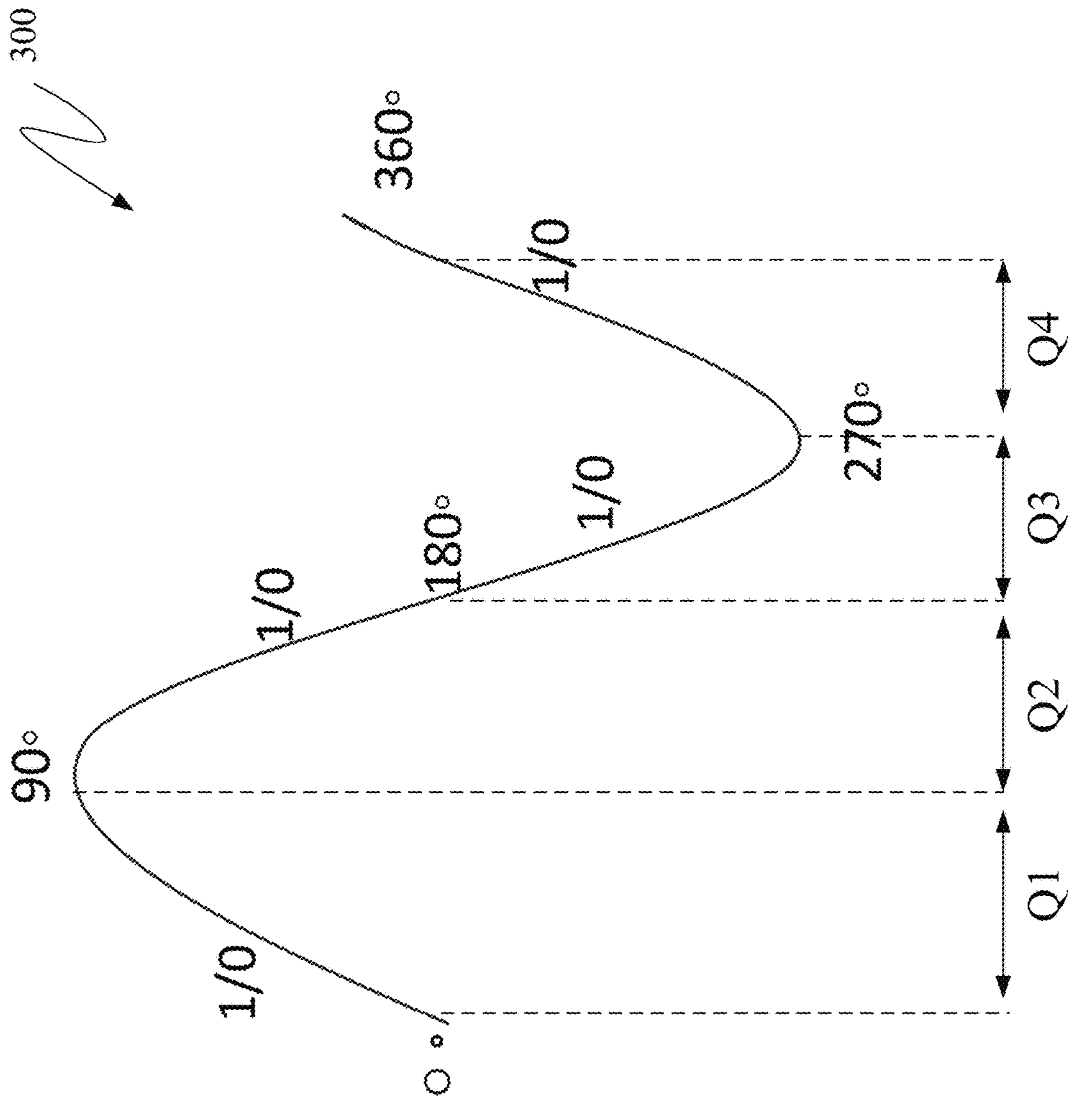
FIG. 3 illustrates a single period of a modulated waveform in accordance with an embodiment.

FIG. 3 illustrates a single period of a modulated waveform 300 to which reference will be made in further describing Example 1. Again, Example 1 contemplates that 4 data bits are to be encoded within each period of the modulated waveform resulting from the MLF layering process. Accordingly, it may be appreciated that the single period 300 may be segmented into four quadrants. Specifically, consider a first quadrant (Q1) to extend between 0 degrees and 90 degrees and represent a first data bit. A second quadrant (Q2) extends from 90 degrees to 180 degrees and represents a second data bit. A third quadrant (Q3) extends from 180 degrees to 270 degrees and represents a third data bit. A fourth quadrant (Q4) extends from 270 degrees to 360 degrees and represents a fourth data bit.

In one embodiment layered waveforms are summed at defined points in time and at defined phases in order to shift the shape of the modulated waveform 300 relative to that of a carrier signal in order to encode one bit of data in each of Q1, Q2, Q3 and Q4. For example, each shape change appearing as a forward phase shift (to the right in FIG. 3) of the waveform 300 may represent a "1" in the data sequence being encoded and each backward or reverse phase shift (to the left in FIG. 3) of the waveform may represent a "0" in the data sequence. that represents a 0.

Figure 4:
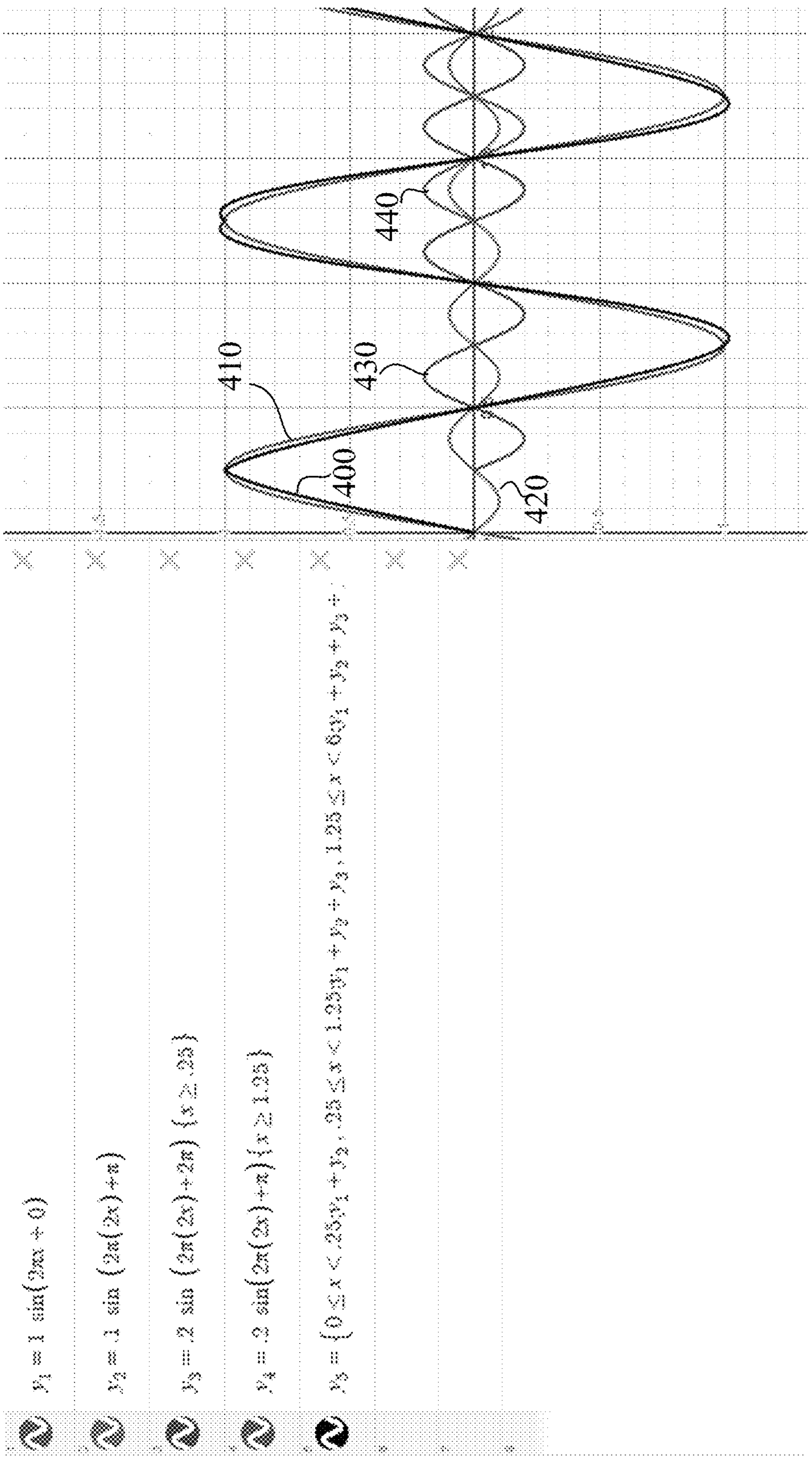
FIG. 4 illustrates a modulated waveform which has been generated pursuant to a multi-layered frequency modulation process of the disclosure.

Referring now to FIG. 4, an illustration is provided of a modulated waveform 400 which has been generated pursuant to the MLF process of Example 1 to encode the desired data sequence 1,0,1,1,0,1,0,0. Again, in the case of Example 1 layering signals of two frequencies are used in an unlimited fashion to encode the desired data sequence. In this example the carrier signal 410 is defined by the equation below for $y_1$ as a function of arbitrary units of time x, which corresponds to an unmodulated sine wave. A set of three layering signals, defined by the equations below for $y_2$, $y_3$, $y_4$, respectively, are respectively represented by the unmodulated time-shifted layering signals 420, 430, 440. In this example the angular frequency of the carrier signal 410 is 2π, and the angular frequencies of each of the layering signals 420, 430, 440 are 4π, i.e., twice the carrier signal frequency. The layering signals 420, 430, 440 and the carrier signal 410 are summed as set forth in the equation below for $y_5$, which defines the modulated waveform 400.

$$y_1 = 1\ \sin(2\pi x + 0)$$
$$y_2 = .1\ \sin(2\pi(2x) + \pi)$$
$$y_3 = .2\ \sin(2\pi(2x) + 2\pi)\ \{x \geq .25\}$$
$$y_4 = .2\ \sin(2\pi(2x) + \pi)\ \{x \geq 1.25\}$$
$$y_5 = \begin{pmatrix} y_1 + y_2 & 0 \leq x < .25 \\ y_1 + y_2 + y_3 & .25 \leq x < 1.25 \\ y_1 + y_2 + y_3 + y_4 & 1.25 \leq x < 6 \end{pmatrix}$$

As may be appreciated from FIG. 4, each of the layering signals 410, 420, 430 are of an amplitude less than an amplitude of the carrier signal 410 and are summed with the carrier signal 410 during different periods of the carrier signal 410 and at different respective phases relative to the carrier signal 410. As is discussed below, the layering signals 410, 420, 430 are summed with the carrier signal 410 such that that differences between the instantaneous amplitude or shape of the modulated waveform 400 and that of the carrier signal 410 encode the exemplary data sequence 1,0,1,1,0,1, 0,0 within the modulated waveform 400.

Referring again to FIG. 4, in the embodiment of Example 1 the carrier signal 410 ($y_1$) is seen to be a sine wave having an amplitude of 1 and a phase of 0 relative to the origin of FIG. 4. Layering signal 420 ($y_2$) is the first signal to be summed (layered) with carrier signal 410. Again, the first layering signal 420 has an angular frequency of 4π that is twice the frequency of carrier signal 410, is shifted in phase by π relative to the carrier signal 410, and is added to the carrier signal 410 through a summation occurring at a point in time at which the displacement of the carrier signal 410 is zero (i.e., at a time 0 in FIG. 4). This summation of the first layering signal 420 and the carrier signal 410 results in an initial portion of modulated waveform 400, which has a shape that is shifted to the right in FIG. 4 relative to the carrier signal A for time values less than 0.25. At a time of 0.25, the second layering signal 430 ($y_3$) is summed with carrier signal 410 and layering signal 420. As shown in FIG. 4, the summing of layering signal 430, which is shifted in phase by 2π, is initiated when the angular displacement of the carrier signal 410 is at 90 degrees.

As may be appreciated by comparing the shape of the modulated waveform 400 and the carrier signal 410 beginning at an angular displacement of the carrier signal of around 180 degrees, the summation of layering signal 430 with modulated waveform 400 changes the instantaneous amplitude of the modulated waveform 400, which causes a shift to the right in FIG. 4 relative to the shape of the carrier signal 410 (which is depicted in FIG. 4 for reference). This shift approximates a forward phase shift of the modulated waveform 400. A third layering signal 440 ($y_4$), which is of the same frequency as first and second layering signals 420 and 430 and has a phase shift of π, is layered (added) into the modulated waveform 400 at the 180-degree point of the second period of signal 400. As shown in FIG. 4, the summation of the third layering signal and the modulated waveform 400 alters the instantaneous amplitude or shape of the modulated waveform 400 in such a way as to approximate a backwards phase shift of the modulated waveform 400.

As a result of the summation of the first, second and third layering signals 420, 430, 440 with the carrier signal 410 in the manner illustrated by FIG. 4, the resultant modulated waveform 400 ($y_5$) exhibits phase shifts in the quadrants of its first two periods. These phase shifts correspond to forward, backward, forward, forward, backward, forward, backward, backward phase shifts, which in the embodiment of FIG. 4 represent the sequence 1,0,1,1,0,1,0,0. This process could continue indefinitely. That is, one could continue to indefinitely add layering signals. of the same frequency (i.e., twice the frequency of the carrier signal 410) and of the proper phase, at appropriate times to cause shifts in the modulated waveform 400 relative to the carrier signal 410 corresponding to a logical 1 and or 0. In this way data sequences of arbitrary length may be conveyed over a time-based channel using the layering signal methodology illustrated by FIG. 4.

Figure 5:
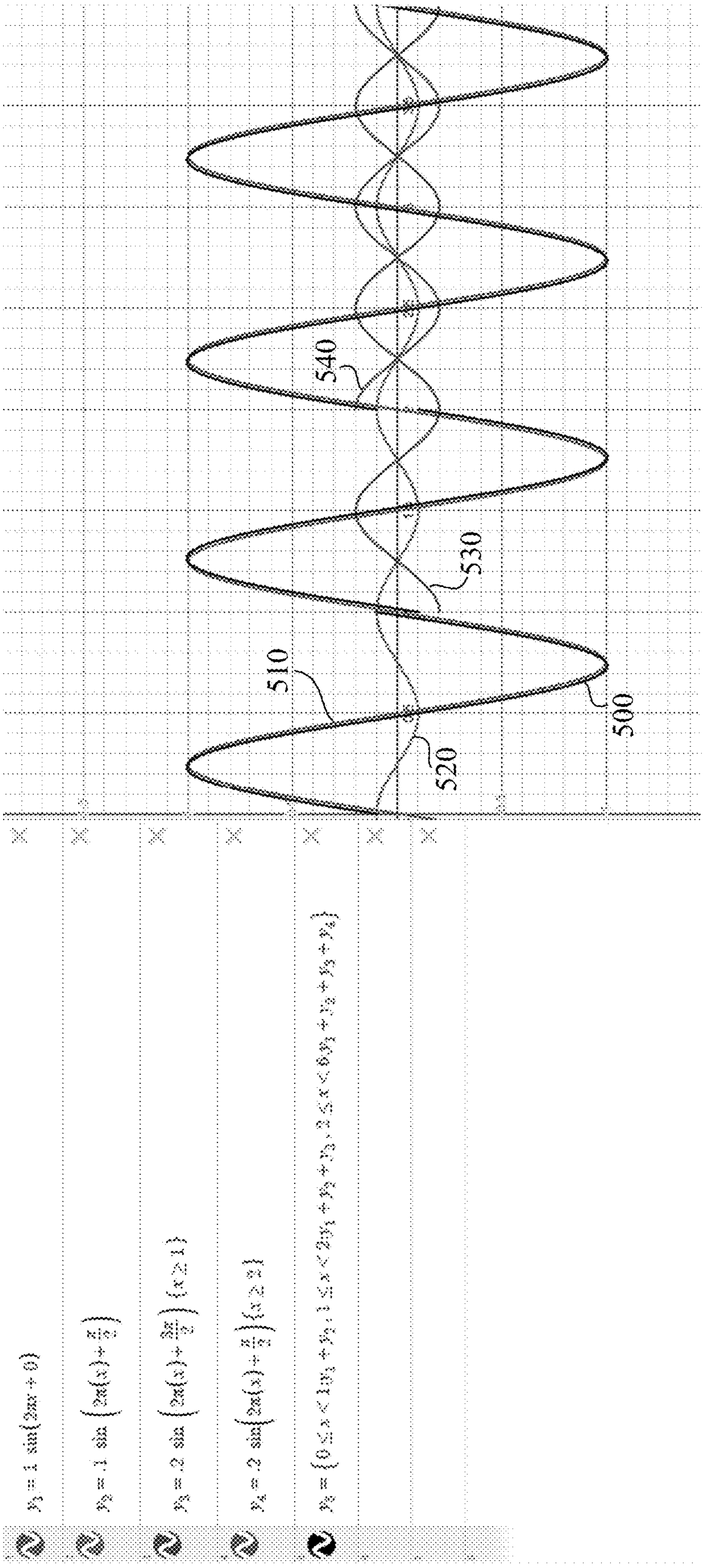
FIG. 5 illustrates a signal modulation process utilizing signal layering in accordance with the disclosure.

Attention is now directed to FIG. 5, to which reference will be made in describing a somewhat simpler example, referred to herein as Example 2, of a signal modulation process utilizing signal layering in accordance with the disclosure. Rather than utilizing signals of two frequencies as in Example 1, in Example 2 a carrier signal 510 ($y_1$) and a first layering signal 520 ($y_2$), a second layering signal 530 ($y_3$) and a third layering signal 540 ($y_4$) of the same frequency are used in an unlimited, layered fashion to generate a modulated waveform 500 ($y_5$) having shape features representing digital data which is desired to be conveyed. In Example 2 it will be assumed that the carrier signal 510 and the first, second and third layering signals 520, 530, 540 are all of a specified, common frequency. In exemplary embodiments the frequency of the carrier signal 500 may be specified to be of essentially any desired value capable of being generated, sampled and processed as described herein by available communications hardware. Accordingly, in one illustrative implementation consistent with the embodiment of FIG. 5, frequency of the carrier signal 510 and the frequencies of the first, second and third layering signals 520, 530, 540 are all set at 2 MHz.

The layering signals 520, 530, 540 and the carrier signal 510 are summed as set forth in the equation below for $y_5$, which defines the modulated waveform 500.

$$y_1 = 1\ \sin\ (2\pi x + 0)$$
$$y_2 = .1\ \sin\ \left(2\pi(x) + \pi/2\right)$$
$$y_3 = .2\ \sin\ \left(2\pi(x) + 3\pi/2\right)\ \{x \geq 1\}$$
$$y_4 = .2\ \sin\ \left(2\pi(x) + \pi/2\right)\ \{x \geq 2\}$$
$$y_5 = \begin{pmatrix} y_1 + y_2 & 0 \leq x < 1 \\ y_1 + y_2 + y_3 & 1 \leq x < 2 \\ y_1 + y_2 + y_3 + y_4 & 2 \leq x \end{pmatrix}$$

As may be appreciated from FIG. 5 and the preceding equations for the carrier signal 510 ($y_1$) and the layering signals 520, 530, 540 ($y_2$, $y_3$, $y_4$), each of the layering signals 520, 530, 540 are of an amplitude substantially less than an amplitude of the carrier signal 510. Indeed, in the embodiment of FIG. 5 the amplitudes of the layering signals 520, 530, 540 do not exceed 20% of the amplitude of the carrier signal 510. Also with reference to FIG. 5, the modulated waveform 500 ($y_5$) resulting from summation of the carrier signal 510 and layering signals 520, 530, 540 at selected points in the period of the carrier signal 510 results in modulated waveform 500 being of the same frequency as the carrier signal 510.

Continuing with Example 2 as illustrated by FIG. 5, it will be assumed that it is desired that modulated waveform 500 be encoded to convey the sequence of data bits 0,1,0. In the embodiment of FIG. 5 a change in instantaneous amplitude or shape change appearing as a forward phase shift near the middle of each cycle of modulated waveform 500 (i.e., between approximately 90 and 270 degrees) corresponds to a logical "1". Similarly, in this embodiment a change in instantaneous amplitude or shape appearing as appearing as a backwards phase shift near the middle of each cycle of modulated sinusoidal signal 500 corresponds to a logical "0". Accordingly, in order to encode the data sequence 0,1,0 in modulated waveform 500 it will be desired to add layering signals 520, 530, 540 to the carrier signal 510 at selected points in periods of the carrier signal 510 so as to induce the desired shape changes in the modulated waveform 500. These desired shape changes in the modulated waveform 500 will appear (relative to the carrier signal 510) as a phase shift backward, followed by a phase shift forward, followed by a phase shift backward.

As shown in FIG. 5, the layering signal 520 (which is of the same frequency as the carrier signal 510 and is shifted in phase by $\pi/2$ relative to the carrier signal 510) is added to the carrier signal 510 at a beginning of an initial period of the carrier signal 510 when its instantaneous amplitude (i.e., displacement) is zero. As a result, the instantaneous amplitude of the modulated waveform 500 resulting from this summing of the carrier signal 510 and layering signal 520 appears to shift the modulated waveform 500 backwards in phase (i.e., to the left in FIG. 5) relative to the phase of carrier signal 510. Next, layering signal 530 (which is of the same frequency as the carrier signal 510 and is shifted in phase by $3\pi/2$ relative to the carrier signal 510) is summed with carrier signal 510 at the beginning of the second period of carrier signal 510. This summation causes a shape change in the modulated waveform 500 relative to the carrier signal appearing as a phase shift forward. Finally, layering signal 540 (which is of the same frequency as the carrier signal 510 and is shifted in phase by $\pi/2$ relative to the carrier signal 510) is summed with the carrier signal 510 and with layering signals 520, 530 at the beginning of the third period of carrier signal 510. This summation causes a shape change in the modulated waveform 500 corresponding to a phase shift backward relative to the carrier signal 510. Thus, the phase shifts introduced into the modulated waveform 500 relative to the carrier signal 510 by the layering signals 520, 530, 540 are seen to encode the desired bit sequence of 0,1,0.

Although in Example 2 each phase shift is imposed at a beginning of one of the periods of the modulated waveform 500, in other embodiments such phase shifts could occur elsewhere during periods of the waveform 500 to represent bit values. Indeed, such phase shifts may be made to occur at essentially any desired point in periods of a modulated waveform through summing of layering signals of selected phases together with a carrier signal at selected points in periods of the carrier signal.

In the embodiment of FIG. 5, the layering signals $y_2$, $y_3$, $y_4$ are of specifically chosen phases when summed with the carrier signal $y_1$ at specifically chosen points within periods of the carrier signal $y_1$ to yield a desired shape of the modulated waveform $y_5$. That is, the signal layering process encodes input data by producing relatively subtle but detectable apparent phase shifts in the modulated waveform $y_5$ relative to the carrier signal $y_1$. It will be recognized that this sequential summation of the layering signals $y_2$, $y_3$, $y_4$ and the carrier signal $y_1$ is fundamentally different from conventional amplitude modulation, in which two signals are simply multiplied together and not added or otherwise summed. Moreover, in conventional amplitude modulation the frequencies of the signals multiplied together are not selected with a view toward causing phase shifts of the type described herein with respect to a carrier frequency. In contrast, embodiments of the SLF and MLF modulation techniques of the disclosure contemplate selection of layering signals of specific frequencies and phases for sequential summation with a carrier signal at different times. Such sequential summation differs from the approach taken in conventional forms of modulation such as amplitude modulation, in which a modulation signal is continuously applied to a carrier signal. This process of sequentially adding layering signals to a carrier signal has been found to yield modulated waveforms having nearly all of their spectral energy confined within a very narrow bandwidth around the frequency of the carrier signal. As a consequence, the disclosed SLF and MLF modulation techniques are believed to be orders of magnitude more spectrally efficient than convention modulation techniques such as, for example, amplitude modulation, frequency modulation and phase modulation.

In a first embodiment of the time domain modulator 134 suitable for implementing the SLF modulation scheme of FIG. 5, the time domain modulator 134 (FIG. 1) makes a determination prior to the start of each period of the waveform 500 as to whether the bit value encoded by the current period of the waveform 500 is the same as the bit value encode by the next period. If so, the time domain modulator 134 will recognize that no new layering signal needs to be added to the waveform 500 to initiate a phase shift. That is, the waveform 500 would be allowed to continue to be shifted in the same way relative to the carrier signal 510 in the next period of the waveform 500 as in the current period. If instead the time domain modulator 134 were to determine that the bit value to be represented by the next period of the waveform 500 is different from the bit value represented by the current period of the waveform 500, then the time domain modulator 134 could add a layering signal to the waveform 500 so as to change its shape and thereby effect a phase shift resulting in its next period so as to represent the different bit value. The time domain modulator 134 could be similarly configured to implement MLF layering schemes of the type discussed above with reference to FIG. 4 by generating and summing layering signals with a carrier signal in order to represent input data bits. Although this approach may be feasible in certain lower frequency applications in which a single bit of input data is encoded by each period of the modulated waveform 500, in view of the limitations of existing processing technology it may not be suitable for higher frequency embodiments.

In the first embodiment of the time domain modulator 134 discussed above (whether configured for SLF or MLF modulation), the modulator 134 could create the desired modulated waveform by generating all the layered sinusoidal frequencies discussed in Examples 1 and Example 2. However, as was noted with reference to FIG. 1 this would not be required. Rather, irrespective of whether the time domain modulator is to be configured to implement SLF modulation or MLF modulation, the necessary phases of the layering signals and their respective times of summation with the carrier signal to yield a modulated waveform of a desired shape, i.e., exhibiting desired apparent phase shifts, may be determined in advance. A digital representation of the desired modulated waveform and/or its constituent waveform segments could then be stored in memory 130 (FIG. 1) as modulated waveform(s) 162. During operation of the communication device 100, computing elements 104 configured to execute code corresponding to the time domain modulator 134 could simply recall modulated waveform segments 162 from memory 130 and concatenate them in response to the input data in order to produce a digital representation of a modulated waveform of the desired shape. It may be appreciated that in Example 2 only two shapes of cycles (i.e., waveform periods) are used to generate the resulting modulated waveform. Specifically, a period/cycle exhibiting a left shift and a period/cycle exhibiting a right shift are the only constituent waveform segments 162 needed to produce the desired modulated waveform representing a sequence of data values. Accordingly, the computing elements 104 as configured to implement the time domain modulator would simply recall the digital representations of the waveform segments 162 corresponding to the bit values within the stream of input data 102 and provide such digital representations to the RF components 108. As discussed above with reference to FIG. 1, the RF components 108 may generate a modulated RF waveform 162 corresponding to the digital representations of the waveform segments 162 provided by the computing elements 104 and send the modulated sinusoidal RF waveform 162 to the amplifier 114. The antenna(s) 122 may then transmit the amplified RF waveform 162 as the modulated RF waveform 150.

Figure 6:
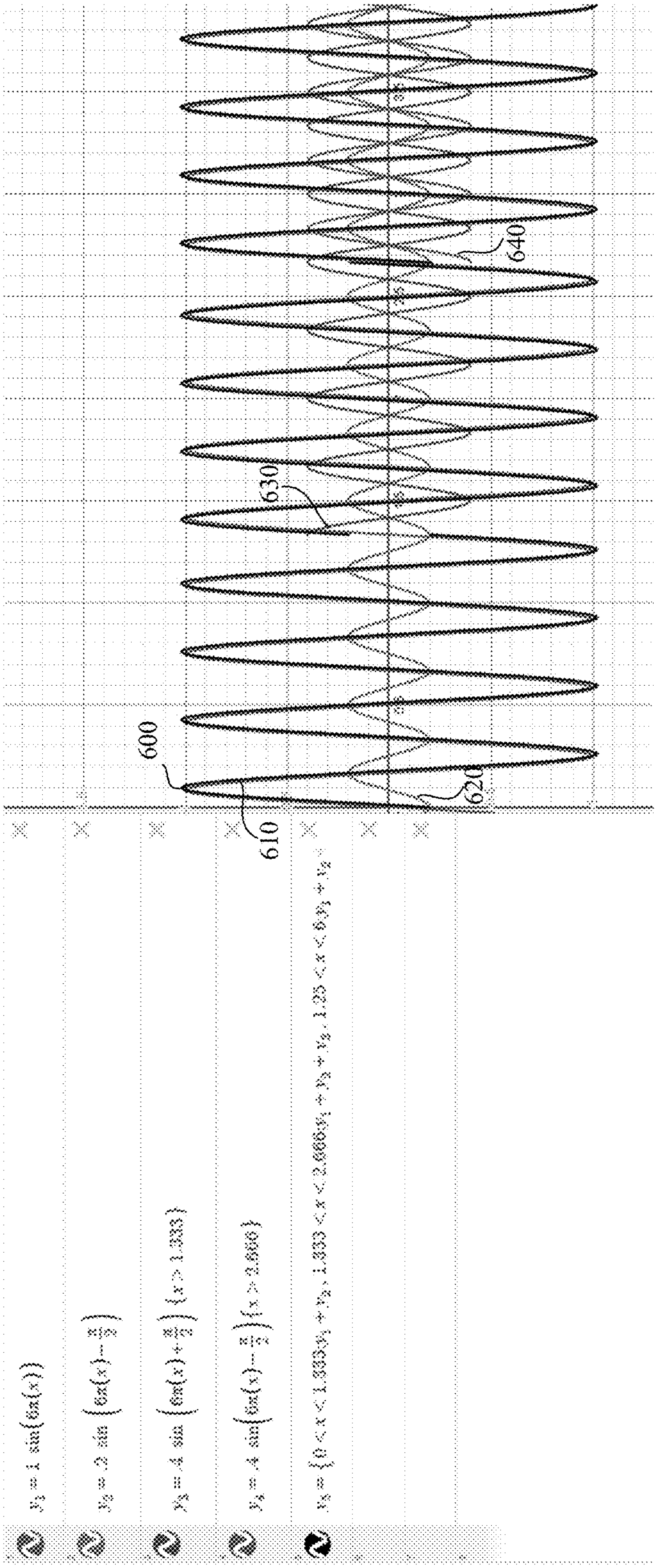
FIG. 6 illustrates a signal layering modulation process in which a modulated waveform is created by using layering signals to encode each input data bit over multiple periods of a carrier signal.

Turning now to FIG. 6, an illustration is provided of an exemplary signal layering modulation process (Example 3) in which a modulated waveform 600 is created by using layering signals 620, 630, 640 to encode each input data bit is encoded over multiple periods of a carrier signal 610. Recall that in Example 1, four (4) bits of data are encoded per period of the modulated waveform and in Example 2 one (1) bit of data is encoded in per period of the encoded waveform. In Example 3 as illustrated by FIG. 6, a single data bit is "spread" through a summation operation over four (4) carrier cycle periods, although in other embodiments the single data bit may be encoded by essentially any desired number of carrier cycle periods. It is noted that that Example 3 establishes that the disclosed layering signal modulation scheme is not limited to embodiments in which a data bit is encoded with respect to one period or cycle of a carrier signal (or fraction thereof) but also may be employed to encode single data bits over multiple carrier signal cycles.

Although FIG. 6 illustrates the respective shapes and relative relationships of the modulated waveform 600, the carrier signal 610 and the layering signals 620, 630, 640 and is not limited to representation of any specific absolute frequency, for purposed of discussion it is assumed that it is desired to use the SLF layering scheme of FIG. 6 to transmit 100 million bits of data per second Mbps. It will be further assumed that the frequency of the carrier signal 610, and hence also of the modulated waveform 600, is 400 million Hertz (MHz) in view of a desire or requirement to use antenna(s) 122 of smaller size for transmission. In view of these relatively high frequencies, the layering scheme of FIG. 6 in which each input data is spread over 4 cycles of the carrier signal 620 may attractive in view of the inherent redundancy it provides. For example, as will be apparent from the following discussion, if a receiver were to receive just a single period of the 4 periods used to represent a single bit of input data it would nonetheless be possible for the receiver to determine such bit and thereby continue to decode the transmitted signal.

Before describing the present Example 3 in detail with reference to FIG. 6, an overview of the layered modulation process in the present context involving a 400 MHZ carrier signal is provided. The process may begin with transmission of the 400 MHz carrier signal. After an initial 4 periods of the 400 MHz carrier signal, and after each subsequent of 4 periods of the 400 MHZ carrier signal, a new layering sinusoid of 400 MHz of a chosen phase may be summed with the carrier signal. In one embodiment a new 400 MHz layering sinusoid is only selected for summing with the 400 MHz carrier signal during a given 4 period sequence of the carrier signal if the data bit to be represented by such given 4 period sequence is different from the data bit represented by the preceding 4 period sequence of the carrier signal. For example, in the case in which a first 400 MHz layering sinusoid is summed with the 400 MHz carrier signal during a certain 4 period sequence of the 400 MHz carrier signal so as to represent a first data bit in the form of a logical "0" (i.e., such summing causing an apparent shift to the left in the modulated waveform resulting in such summing). If the second data bit to be represented is also a logical "0", then a second 400 MHz layering sinusoid need not be added to the 400 MHz carrier signal during the next 4 period sequence of the 400 MHz carrier signal. This is because the next 4 periods of the modulated signal resulting from the summation of the 400 MHz carrier signal and the first 400 MHz layering sinusoid will still appear shifted to the left of the 400 MHz carrier signal and will thus also represent a logical "0". Assuming the third data bit to be represented is a logical "1", then beginning with the third 4-period sequence of the 400 MHz carrier signal (i.e., beginning at the ninth period of the 400 MHz carrier signal), another 400 MHz layering signal is added to the sum of the 400 MHz carrier signal and the first 400 MHz layering signal in order to cause the resultant modulated signal to shift to the right relative to the 400 MHz carrier signal and thereby encoded a logical "1" within the modulated waveform.

Referring now to FIG. 6 in greater detail, it will be assumed that it is desired to encode the bit sequence 1, 0, 1 in the modulated waveform 600 ($y_5$) through sequential summation of first, second and third layering signals 620, 630, 640 ($y_2$, $y_3$, $y_4$) to the carrier signal 610 ($y_1$). The signals $y_1$, $y_2$, $y_3$, $y_4$, $y_5$ may be represented as follows:

$$y_1 = 1\ \sin(6\pi(x))$$

$$y_2 = .2\ \sin(6\pi(x) - \pi/2)$$

$$y_3 = .4\ \sin(6\pi(x) + \pi/2)\ \{x > 1.333\}$$

$$y_4 = .4\ \sin(6\pi(x) - \pi/2)\ \{x > 2.666\}$$

$$y_5 = \begin{pmatrix} y_1 + y_2 & 0 \le x \le 1.333 \\ y_1 + y_2 + y_3 & 1.333 < x \le 2.666 \\ y_1 + y_2 + y_3 + y_4 & x > 2.666 \end{pmatrix}$$

As shown in FIG. 6, the first layering signal 620 is summed with the carrier signal 610 at the beginning of the first period of the carrier signal 610 (i.e., at 0 degrees of the carrier signal 620). Again, in the present example it is assumed that the carrier signal 610 and the first layering signal 620 are each of a frequency of 400 Mhz. Since the first layering signal 620 is 90 degrees out of phase with the carrier signal 610, this addition (layering) of the first layering signal 620 and the carrier signal 610 causes the resultant modulated signal 600 to shift to the right relative to the carrier signal 610, thereby resulting in the encoding of a logical "1". After four periods of the modulated waveform 600 exhibiting this rightward phase shift have elapsed, the next bit in the desired sequence, i.e., a logical "0", is to be generated. In one embodiment this is done by inducing the modulated waveform 600 to shift back to the left of the carrier signal 610. Accordingly, at the beginning of the fifth period of the carrier signal 610 (and modulated waveform 600), the second layering signal 630 is added to the modulated waveform 600 (which immediately prior to period 5 of the modulated waveform 600 is defined by the above-referenced sum of the carrier signal 610 and the first layering signal 620). In the present example the second layering signal 630 is also of a frequency of 400 Mhz signal and is shifted in phase by 180 degrees relative to the first layering signal 620 and has an amplitude that is twice the amplitude of the first layering signal 620. This addition of the second layering signal 630 alters the instantaneous amplitude of the modulated waveform 600 so that its shape shifts from being to the right of the carrier signal 610 to being to the left of the carrier signal 610, thus representing a logical "0". As shown, this state of logical "0" exists during periods 5, 6, 7 and 8 of the modulated waveform 600. In order to send the final bit of data in the desired sequence, which is a logical "1", a third layering signal 640 is added to the modulated waveform 600 at the beginning of period 9 of the modulated waveform 600. In the present example the third layering signal 640 is of a frequency of 400 MHz and is shifted in phase by 90 degrees relative to the carrier signal 610. This addition of the third layering signal 640 alters the instantaneous amplitude of the modulated waveform 600 so that its shape shifts to being back to the right of the carrier signal 610, thus representing a logical "1". As shown, this state of logical "1" exists during periods 9, 10, 11 and 12 of the modulated waveform 600.

Figure 7:
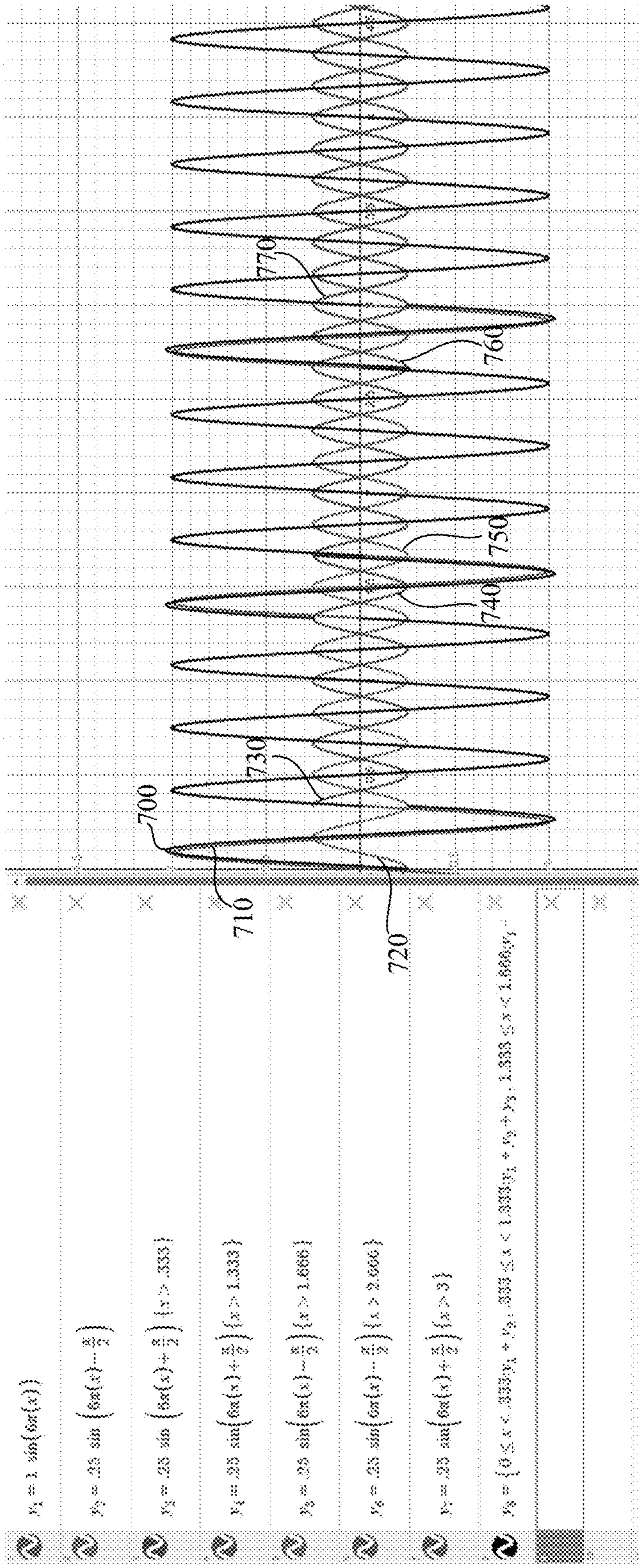
FIG. 7 illustrates another example of a form of layered signal modulation in accordance with the disclosure.

Attention is now directed to FIG. 7, which illustrates another example (Example 4) of a form of layered signal modulation in accordance with the disclosure. Although the approach embodied by Example 4 is related to the methodology of the preceding Example 3, in the case of Example 4 it is desired that data bits only be encoded by a subset of the periods the resultant modulated waveform 700 and that the remainder of the periods of modulated waveform are not shifted in phase relative to the carrier signal 710 (i.e., are effectively indistinguishable from corresponding periods of the carrier signal). Specifically, in Example 4 it is desired that bits of an input data sequence only be encoded by every fourth period of the modulated waveform 700 (e.g., by periods 1,5,9,13 etc.), and that the remaining periods of the modulated waveform 700 (e.g., periods 2,3,4,6,7,8,10, 11, 12) remain unmodulated relative to the carrier signal 710. This may be achieved by summing first, second, third, fourth, fifth and sixth layering signals 720, 730, 740, 750, 760, 770 ($y_2$, $y_3$, $y_4$, $y_5$, $y_6$, $y_7$) with the carrier signal 710 ($y_1$) to yield the modulated waveform ($y_8$) in the manner illustrated by FIG. 7.

As may be appreciated with reference to the expressions for $y_1$, $y_2$, $y_3$, $y_4$, $y_5$, $y_6$, $y_7$ in FIG. 7, in Example 4 the carrier signal 710 and the first, second, third, fourth, fifth and sixth layering signals 720, 730, 740, 750, 760, 770 are all of the same frequency (e.g., 400 MHZ). As shown, the first layering signal 720 is summed with the carrier signal 710 at the beginning of the first period of the carrier signal 710. This causes the desired relative phase shift between the modulated signal 700 and the carrier signal 710 during the first period of the carrier signal 710 (and the first period of the modulated signal 700). However, in contrast to the procedure followed in Example 3, at the beginning of the second period of the carrier signal 710 the second layering signal 730 is summed with the carrier signal 710 and the first layering signal 720. Since the second layering signal 730 is of the same frequency as the first layering signal 720 but is 180 degrees out of phase with the first layering signal 720, the first layering signal 720 and the second layering signal 730 will destructively interfere beginning at period 2 of the carrier signal 710. As a result of this destructive interference, the modulated waveform 700 is identical to the carrier signal 710; that is, the modulated waveform 700 appears to be purely sinusoidal during periods 2,3,4 of the modulated waveform 700. At the beginning of period 5 of the carrier signal 710, the third layering signal 740 would be added to the carrier signal 710 and the first and second layering signals 720, 730. This summation would induce a desired phase shift in the modulated waveform 700 and thereby cause period 5 of the modulated waveform 700 to represent the next bit of input data. At the beginning of period 6 of the carrier signal 710 the fourth layering signal 750 would also be added in order to effectively cancel out the modulation imparted to the carrier signal 710 by the third layer signal 740. Next, at the beginning of period 9 of the carrier signal 710, the fifth layering signal 760 would be added to the carrier signal 710 and the preceding layering signals. This addition of the fifth layering signal causes another desired phase shift in the modulated waveform 700 and thereby causes period 9 of the modulated waveform 700 to represent the next bit of input data. At the beginning of period 10 of the carrier signal 710 the sixth layering signal 770 would also be added in order to effectively cancel out the modulation imparted to the carrier signal 710 by the fifth layering signal 760.

Referring to FIG. 7, it may be appreciated that the modulated waveform 700 only exhibits a phase shift relative to a carrier phase during periods 1, 5 and 9. That is, the modulated signal 700 corresponds substantially identically to the carrier signal during periods 2, 3, 4, 6, 7, 8, 10, 11 and 12 of the modulated signal 700.

As was discussed above with reference to FIG. 1, there exist at least two primary ways that SLF and MLF modulation may be implemented in accordance with the disclosure. In a first approach the time domain modulator 134 generates and tracks all of the layering signals required to be essentially summed with the carrier signal in order create the desired modulated waveform encoding the input data 102. However, as previously indicated, in view of the capabilities of existing processors a more efficient approach may involve (i) determining if it is desired to utilize SLF or MLF modulation, and (ii) determining the characteristics of the waveforms used to encode logical 1s and 0s. For example, it may be desired that to represent a logical "0" the modulated waveform should exhibit a phase shift in direction "x", by an amount of "y", and at a quadrant location "z". Similarly, in order to represent a logical "1" it may be desired that the modulated waveform 700 shift in a direction of "a" by an amount of "b" at a quadrant location "c". Once this is established the corresponding waveform segments 162 may be stored within memory 130 and recalled by computing elements 104 as needed to represent bits in the input digital data 102.

Figure 8:
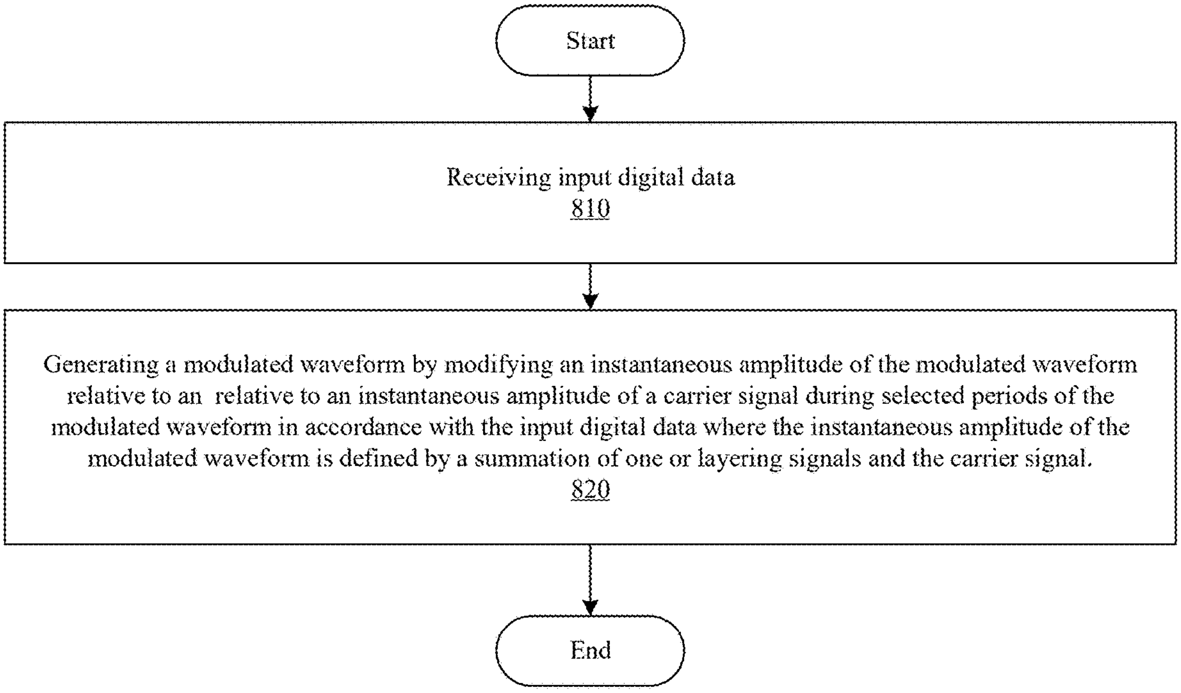
FIG. 8 is a flowchart that describes a signal layering modulation method according to an embodiment.

FIG. 8 is a flowchart that describes a signal layering modulation method according to some embodiments of the present disclosure. At a stage 810, the method includes receiving input digital data. At a stage 820, the method may include generating a modulated waveform by modifying an instantaneous amplitude of the modulated waveform relative to an instantaneous amplitude of a carrier signal during selected periods of the modulated waveform in accordance with the input digital data. The instantaneous amplitude of the modulated waveform during each of the selected periods may be defined by a summation of one or layering signals and the carrier signal.

Figure 9:
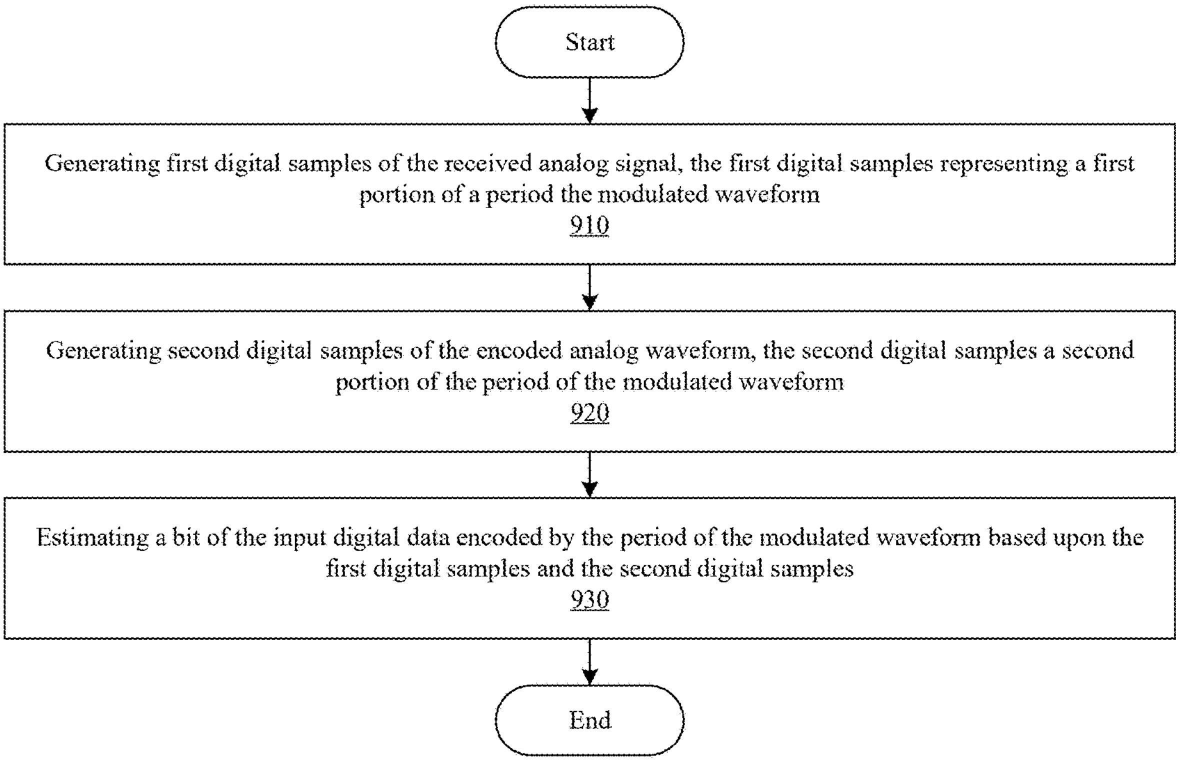
FIG. 9 is a flowchart that describes a method of recovering input digital from a received analog signal formed from a modulated waveform where an instantaneous amplitude of the modulated waveform is defined by a summing of a carrier signal and one of more layering signals.

FIG. 9 is a flowchart that describes a method of recovering input digital from a received analog signal formed from a modulated waveform where an instantaneous amplitude of the modulated waveform is defined by a summing of a carrier signal and one of more layering signals. At a stage 910, the method may include generating first digital samples of a received analog signal, the first digital samples representing a first portion of a period the modulated waveform. At a stage 920, the method may include generating second digital samples of the encoded analog waveform, the second digital samples representing a second portion of the period of the modulated waveform. At a stage 930, the method may include estimating a bit of the input digital data encoded by the period of the modulated waveform based upon the first digital samples and the second digital samples. In some embodiments, the modulated waveform and the carrier signal wave may be of a first frequency. Phase differences between the modulated waveform and the carrier signal occurring during periods of the modulated waveform may represent bits of the input digital data.

Figure 10A:
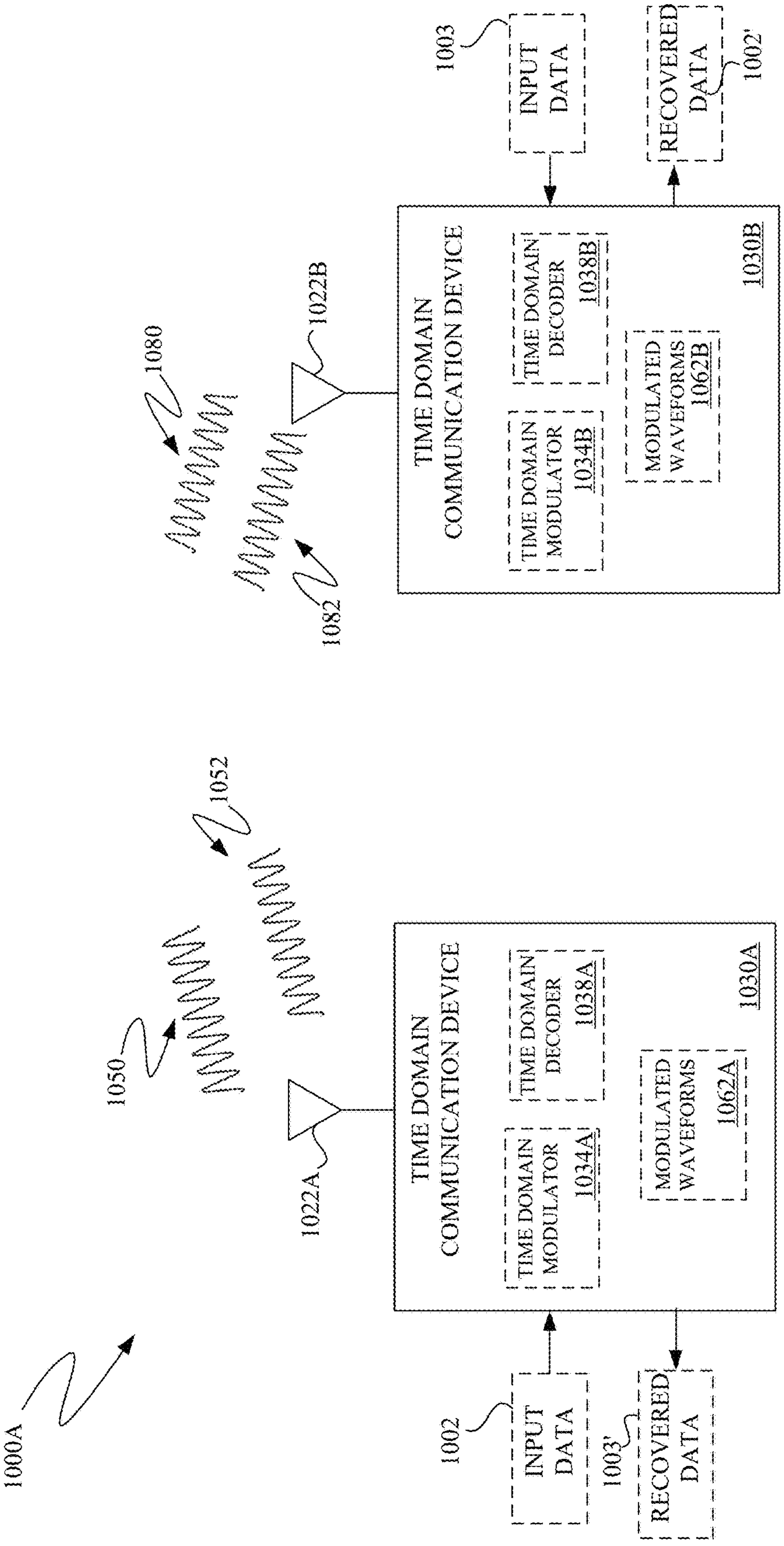
FIGS. 10A and 10B respectively illustrate communication systems configured for communication over time channels in accordance with the disclosure.
Figure 10B:
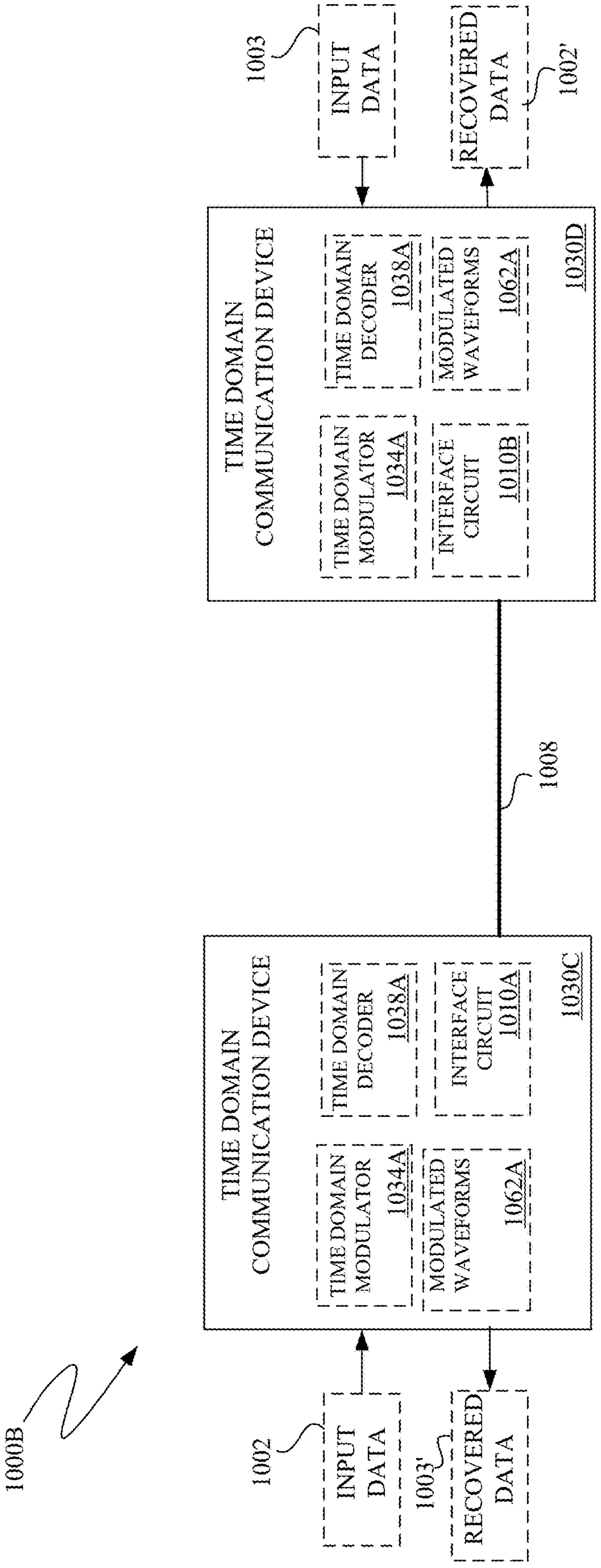

Attention is now directed to FIGS. 10A and 10B, which respectively illustrate communication systems 1000A and 1000B configured for communication over time channels in accordance with the disclosure. In the embodiment of FIG. 10A, a first time domain communication device 1030A and a second time domain communication device 1030B are configured to communicate over a time channel established over an air interface between a first antenna 1022A of the device 1030A and a second antenna 1022B of the device 1030B. In the embodiment of FIG. 10B, a third time domain communication device 1030C and a fourth time domain communication device 1030D are configured to communicate over a time channel established over a physical communication link 1008 (e.g., a coaxial cable or fiber optic cable). As shown, the third time domain communication device 1030C is operatively connected to the physical communication link 1008 by a first interface circuit 1010A and the fourth time domain communication device 1030D is operatively connected to the physical communication link 1008 by a second interface circuit 1010B.

Referring to FIG. 10A, the time domain communication devices 1030A and 1030B may be implemented substantially identically to the time domain communication device 100 of FIG. 1. For clarity of presentation certain elements present in the communication device 100 are not specifically shown in FIG. 10A as being included in the communication devices 1030A and 1030B. The time domain communication devices 1030A and 1030B may each be configured for fully duplexed operation as a communication signal transmitter and a receiver. When functioning as a communication signal transmitter, the communication device 1030A, 1030B operates to generate and transmit a modulated RF waveform 1050, 1080 characterized by apparent shifts in phase relative to a carrier phase, such shifts being representative of input digital data 1002, 1003. In one embodiment the time domain modulator 1034A, 1034B may cause computing elements (not shown) to generate digital representations of modulated waveforms based upon the input data 1002, 1003 by calculating appropriate phase shifts to be incorporated within such digital representations. In such embodiments the time domain modulator 1034A, 1034B would simply generate layering sinusoids of appropriate phases and sum them with a carrier signal at predetermined times within the periods of the carrier signal. Alternatively, the phase shifts appropriate for representation of various bits or bit patterns within the input digital data may be pre-computed in advance and stored as modulated waveform segments 1062A, 1062B. In this embodiment the time domain modulator 1034A, 1034B may operate to direct the concatenation of periods or segments of pre-stored modulated waveforms 1062A, 1062B. The sequence of modulated waveform segments 1062A, 1062B resulting from this concatenation forms a digital representation of a modulated waveform representative of the input data 1002, 1003. Each digital representation of the modulated waveform representative of the input data 1002, 1003 may then be converted into the modulated RF waveform 1050, 1080 and transmitted by the antennas 1022A, 1022B.

When functioning as a communication signal receiver, the communication device 1030A, 1030B operates to receive and decode a received modulated RF waveform 1052, 1082 representative of recovered input data 1003', 1002'. Upon being received by the antenna(s) 1022A, 1022B, the modulated RF waveform 1052, 1082 is amplified and converted to a digital form for processing by a time domain decoder 1038A, 1038B. During receive mode operation the computing elements 104 are configured to implement the time domain decoder 1038A, 1038B to produce estimates of the recovered data 1003', 1002' in the manner described above with reference to FIG. 1.

Referring to FIG. 10B, the time domain communication devices 1030C, 1030D may each be implemented substantially identically to the time domain communication device 100 of FIG. 1, with the exception that each device 1030C, 1030D is configured with an interface circuit 1010A, 1010B rather than an antenna. Each interface circuit 1010A, 1010B is configured with circuitry appropriate for sending and receiving information conveyed by the physical communication link 1008. As a consequence, implementations of each interface circuit 1010A, 1010B will vary depending upon the type of communication link 1008 employed (e.g., fiber optic cable, coaxial cable).

Figure 11:
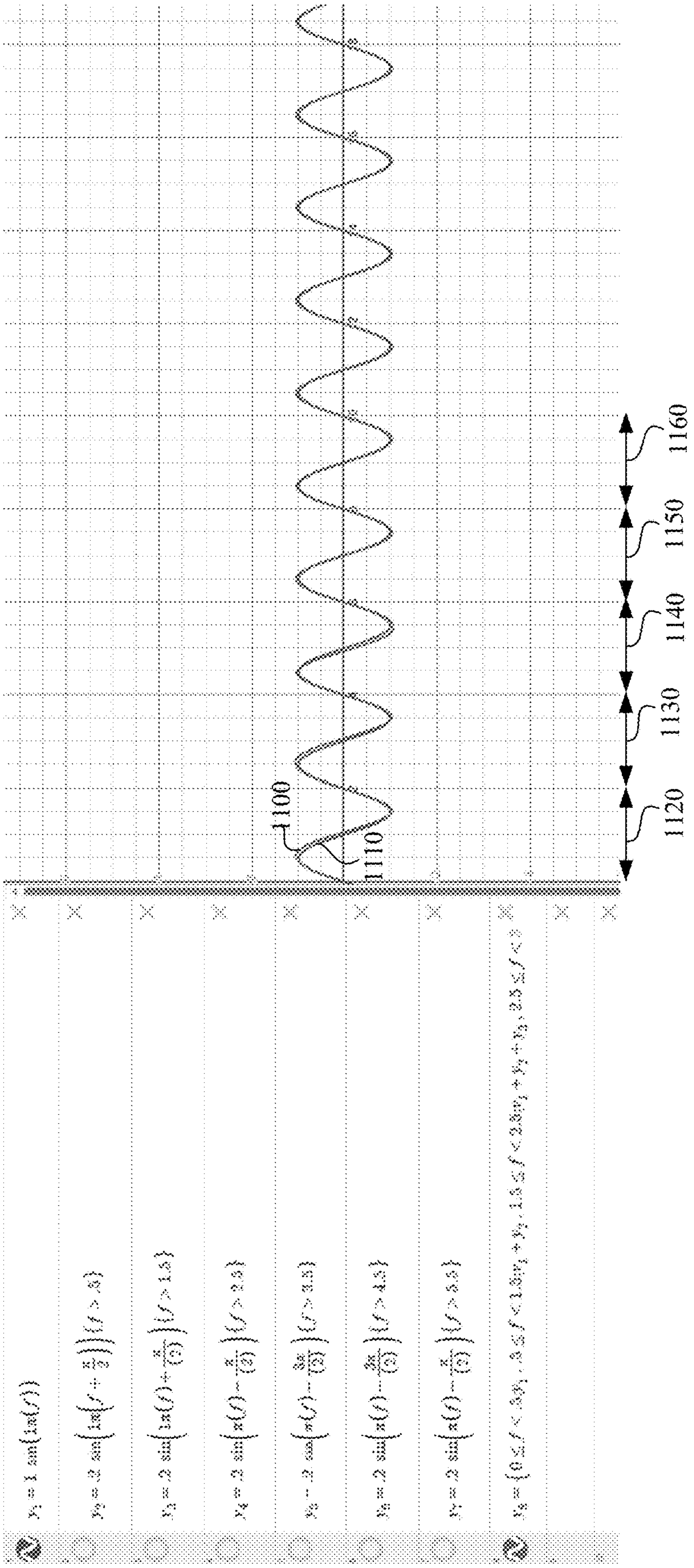
FIG. 11 illustrates another example of a form of layered signal modulation in accordance with the disclosure.

Attention is now directed to FIG. 11, which illustrates another example of a form of layered signal modulation in accordance with the disclosure. In the embodiment of FIG. 11, input data bits are encoded by creating an apparent phase difference between a modulated waveform 1100 ($y_8$) and a phase of a carrier signal 1110 ($y_1$) only within defined portions of the periods of the modulated waveform 1100. This may be achieved by applying a phase-shifting signal to the carrier signal 1110 so as to establish an apparent phase difference between the modulated waveform 1100 and a phase of the carrier signal 1110 during such a defined portion of a given period of the modulated waveform 1100. A different phase-shifting signal may then be applied to the carrier signal 1110 so as to substantially eliminate this apparent phase difference. In this way an input data stream may be encoded within the modulated waveform 1100 by creating apparent phase differences between the modulated waveform 1100 and the phase of the carrier signal 1110 in only defined portions (e.g., between 90 and 270 degrees) of periods of the modulated waveform 1100.

As may be appreciated with reference to FIG. 11, first, second, third, fourth, fifth and sixth layering signals ($y_2$, $y_3$, $y_4$, $y_5$, $y_6$, $y_7$) are all of the same frequency as the carrier signal 1110 ($y_1$) and the modulated waveform 1100 ($y_8$). The first layering signal ($y_2$) is summed with the carrier signal 1110 beginning at a phase angle of approximately 90 degrees within a first period 1120 of the carrier signal 1110. This first summing alters the instantaneous amplitude of the modulated waveform 1100 relative to that of the carrier signal 1110 so as to cause an apparent advance in a phase of the modulated waveform 1100 relative to a phase of the carrier signal 1110 beginning at a phase angle of approximately 90 degrees. The second layering signal ($y_3$) is then summed with the carrier signal 1110 beginning at a phase angle of approximately 270 degrees within the first period 1120 of the carrier signal 1110. This second summing involving the second layering signal ($y_3$) substantially eliminates the apparent phase difference between the modulated waveform 1100 and the phase of the carrier signal 1110 during the remainder of the first period of the modulated waveform 1100. As a consequence, the modulated waveform 1100 is substantially aligned in phase with the phase of the carrier signal 1110 for phase angles greater than 270 degrees within the first period of the modulated waveform 1100.

This process is repeated during a second period 1130 of the carrier signal 1110 through summation of the carrier 1110 with the third layering signal ($y_4$) and summation of the carrier signal 1110 with the fourth layering signal ($y_5$). Specifically, the summation of the carrier 1110 with the third layering signal ($y_4$) results in an apparent advance in the phase of the modulated waveform 1100 relative to the phase of the carrier signal 1110. This apparent advance in the phase of the modulated waveform 1100 during the second period 1130 is then eliminated as a result of the summation of the carrier signal 1110 with the fourth layering signal ($y_5$).

A similar process occurs during a third period 1140 of the carrier signal 1110. During the third period 1140 the fifth layering signal ($y_6$) is summed with the carrier signal 1110 so as to cause an apparent lag in the phase of the modulated waveform 1100 relative to the phase of the carrier signal 1110. This apparent leg is then eliminated through summing of the sixth layering signal ($y_7$) with the carrier signal 1110 beginning at a phase angle of approximately 270 degrees in the third period 1140 of the carrier signal. Since no layering signals are combined with the carrier signal 1110 during fourth or fifth periods 1150, 1160 of the carrier signal 1110, the modulated waveform 1110 remains in phase with the carrier signal 1100 during the fourth and fifth periods 1150, 1160 of the carrier signal and thereafter. In an embodiment in which an apparent advance in the phase of the modulated waveform 1100 relative to a phase of the carrier signal 1110 encodes a logical "1" and an apparent lag in the phase of the modulated waveform 1100 relative to a phase of the carrier signal 1110 encodes a logical "0", the first three periods 1120, 1130, 1140 of the modulated waveform 1100 would encode the bit sequence 1, 1, 0.

The disclosure discussed herein provides and describes examples of some embodiments of a system for data communication with high spectral efficiency. The designs, figures, and descriptions are non-limiting examples of selected embodiments of the disclosure. For example, other embodiments of the disclosed device may or may not include the features described herein. Moreover, disclosed advantages and benefits may apply to only certain embodiments of the disclosure and should not be used to limit the various disclosures.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other is indicated by the context in which the term is used.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media in which such instructions or code may reside include, without limitation, one time programmable (OTP) memory, protected Random-Access Memory (RAM) and flash memory.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:

receive input digital data; and generating a modulated waveform by combining a plurality of phase-shifting signals with a carrier signal, the generating including:

applying a first phase-shifting signal to the carrier signal to establish a first phase difference between the modulated waveform and a phase of the carrier signal during a first period of the modulated waveform;

applying a second phase-shifting signal to the carrier signal to eliminate the first phase difference between the modulated waveform and the phase of the carrier signal during the first period of the carrier signal;

applying a third phase-shifting signal to the carrier signal to establish a second phase difference between the modulated waveform and the phase of the carrier signal during a second period of the modulated waveform; and applying a fourth phase-shifting signal to the carrier signal to eliminate the second phase difference between the modulated waveform and the phase of the carrier signal during the second period of the carrier modulated waveform, wherein the first phase difference represents a first bit of the input digital data and the second phase difference represents a second bit of the input digital data.

2. The method of claim 1, wherein the applying the first phase-shifting signal includes adding the first phase-shifting signal to the carrier signal beginning at a phase angle of 90 degrees in the first period of the carrier signal.

3. The method of claim 2, wherein the applying the second phase-shifting signal includes adding the second phase-shifting signal to the carrier signal beginning at a phase angle of 270 degrees in the first period of the carrier signal.

4. The method of claim 3, wherein the applying the third phase-shifting signal includes adding the third phase-shifting signal to the carrier signal beginning at a phase angle of 90 degrees in the second period of the carrier signal.

5. The method of claim 4, wherein the applying the fourth phase-shifting signal includes adding the fourth phase-shifting signal to the carrier signal beginning at a phase angle of 270 degrees in the second period of the carrier signal.

6. The method of claim 1, wherein the carrier signal and the first phase-shifting signal, the second phase-shifting signal, the third phase-shifting signal and the fourth phase-shifting signal are sinusoidal.

7. The method of claim 6, wherein the first period and the second period of the modulated waveform are non-sinusoidal and wherein at least a third period of the modulated waveform is sinusoidal.

8. The method of claim 6, wherein the carrier signal and the first phase-shifting signal, the second phase-shifting signal, the third phase-shifting signal and the fourth phase-shifting signal are of an identical frequency.

9. The method of claim 1, wherein amplitudes of the first phase-shifting signal, the second phase-shifting signal, the third phase-shifting signal and the fourth phase-shifting signal are less than an amplitude of the carrier signal.

10. The apparatus of claim 1, wherein amplitudes of the first phase-shifting signal, the second phase-shifting signal, the third phase-shifting signal and the fourth phase-shifting signal are less than 25% of an amplitude of the carrier signal.

11. An method comprising:

receiving input digital data; and generating a modulated waveform having a shape corresponding to a summation of a plurality of phase-shifting signals with a carrier signal, wherein the summation includes:

a first summation of the carrier signal and a first phase-shifting signal and a second phase-shifting signal of the phase-shifting signals, the first summation establishing a first phase difference between the modulated waveform and a phase of the carrier signal during a first period of the modulated waveform; and a second summation of the carrier signal and a third phase-shifting signal and a fourth phase-shifting signal of the phase-shifting, the second summation establishing a second phase difference between the modulated waveform and the phase of the carrier signal during a second period of the modulated waveform, wherein the first phase difference represents a first bit of the input digital data and the second phase difference represents a second bit of the input digital data.

12. The method of claim 11, wherein the first summation includes adding the first phase-shifting signal to the carrier signal beginning at a phase angle of 90 degrees in the first period of the carrier signal.

13. The method of claim 12, wherein the first summation further includes adding the second phase-shifting signal to the carrier signal beginning at a phase angle of 270 degrees in the first period of the carrier signal.

14. The method of claim 13, wherein the second summation includes adding the third phase-shifting signal to the carrier signal beginning at a phase angle of 90 degrees in the second period of the carrier signal.

15. The method of claim 14, wherein the second summation further includes adding the second phase-shifting signal to the carrier signal beginning at a phase angle of 270 degrees in the second period of the carrier signal.

16. The method of claim 11, wherein the carrier signal and the first phase-shifting signal, the second phase-shifting signal, the third phase-shifting signal and the fourth phase-shifting signal are sinusoidal.

17. The method of claim 16, wherein the first period and the second period of the modulated waveform are non-sinusoidal and wherein at least a third period of the modulated waveform is sinusoidal.

18. The method of claim 16, wherein the carrier signal and the first phase-shifting signal, the second phase-shifting signal, the third phase-shifting signal and the fourth phase-shifting signal are of an identical frequency.

19. The method of claim 11, wherein amplitudes of the first phase-shifting signal, the second phase-shifting signal, the third phase-shifting signal and the fourth phase-shifting signal are less than an amplitude of the carrier signal.

20. The method of claim 11, wherein amplitudes of the first phase-shifting signal, the second phase-shifting signal, the third phase-shifting signal and the fourth phase-shifting signal are less than 25% of an amplitude of the carrier signal.

21. The method of claim 11, wherein the generating includes concatenating a first waveform segment corresponding to the first period of the modulated waveform and a second waveform segment corresponding to the second period of the modulated waveform.

22. The method of claim 21, wherein the generating further includes accessing digital representations of the first waveform segment and the second waveform segment from a memory.

23. The method of claim 11, wherein the generating includes accessing digital representations of a waveform segment corresponding to the first and second periods of the modulated waveform.

* * * * *